US009081777B1

(12) United States Patent
Krawczyk

(10) Patent No.: US 9,081,777 B1
(45) Date of Patent: Jul. 14, 2015

(54) SYSTEMS AND METHODS FOR SEARCHING FOR MEDIA CONTENT

(71) Applicant: CMN, Inc., Chevy Chase, MD (US)

(72) Inventor: Nick Krawczyk, Chevy Chase, MD (US)

(73) Assignee: CMN, Inc., Chevy Chase, MD (US)

( * ) Notice: Subject to any disclaimer, the term of this patent is extended or adjusted under 35 U.S.C. 154(b) by 0 days.

(21) Appl. No.: 13/682,680

(22) Filed: Nov. 20, 2012

Related U.S. Application Data

(60) Provisional application No. 61/562,993, filed on Nov. 22, 2011, provisional application No. 61/683,164, filed on Aug. 14, 2012.

(51) Int. Cl.
G06F 7/00 (2006.01)
G06F 17/30 (2006.01)

(52) U.S. Cl.
CPC ...... *G06F 17/3002* (2013.01); *G06F 17/30056* (2013.01)

(58) Field of Classification Search
None
See application file for complete search history.

(56) References Cited

U.S. PATENT DOCUMENTS

| 8,171,044 | B2 | 5/2012 | Daigle |
| 8,588,825 | B2 * | 11/2013 | Jonsson ............... 455/466 |
| 8,682,723 | B2 * | 3/2014 | Parsons et al. ........... 705/14.52 |
| 2005/0010565 | A1 * | 1/2005 | Cushing et al. ................ 707/3 |
| 2007/0294281 | A1 * | 12/2007 | Ward et al. ................ 707/102 |
| 2009/0319518 | A1 * | 12/2009 | Koudas et al. ................. 707/5 |
| 2010/0161662 | A1 * | 6/2010 | Jonas et al. ............... 707/780 |
| 2011/0078584 | A1 | 3/2011 | Winterstein et al. |
| 2011/0179062 | A1 | 7/2011 | Lee et al. |
| 2011/0184886 | A1 | 7/2011 | Shoham |
| 2011/0208822 | A1 * | 8/2011 | Rathod ..................... 709/206 |
| 2011/0258204 | A1 | 10/2011 | Hubbard et al. |
| 2011/0282860 | A1 * | 11/2011 | Baarman et al. ............. 707/709 |
| 2011/0282943 | A1 | 11/2011 | Anderson et al. |
| 2011/0307474 | A1 * | 12/2011 | Hom et al. .................. 707/723 |
| 2012/0047219 | A1 | 2/2012 | Feng et al. |
| 2012/0131013 | A1 | 5/2012 | Hobbs et al. |
| 2012/0166931 | A1 * | 6/2012 | Alonso et al. ............... 715/234 |
| 2012/0197995 | A1 | 8/2012 | Caruso |
| 2012/0226678 | A1 | 9/2012 | Park et al. |
| 2012/0233666 | A1 | 9/2012 | Gu |
| 2012/0239763 | A1 * | 9/2012 | Musil ........................ 709/206 |

(Continued)

FOREIGN PATENT DOCUMENTS

| EP | 2416289 A1 * | 2/2012 |
| WO | WO 2008/043143 A1 | 4/2008 |
| WO | WO 2011/153605 A1 | 12/2011 |

OTHER PUBLICATIONS

Kazienko et al, Multidimensional Social Network in the Social Recommender System, Jul. 2011, IEE Transactions on System, Man and Cybernetics—Part A: Systems and Humans., vol. 41,. No. 4, pp. 746-759.*

*Primary Examiner* — Neveen Abel Jalil
*Assistant Examiner* — Karina Levitian
(74) *Attorney, Agent, or Firm* — Wilson Sonsini Goodrich and Rosati

(57) ABSTRACT

Methods and systems for collecting, aggregating and displaying social media content are provided. Social media content can be aggregated from multiple social media providers and presented to a user as a social stream, which can be grouped and/or filtered. In some cases a user can view social media content grouped by social entity, social contributor and/or social tag.

30 Claims, 28 Drawing Sheets

(56) References Cited

U.S. PATENT DOCUMENTS

2012/0284080 A1* 11/2012 De Oliveira et al. ......... 705/7.29
2012/0296920 A1* 11/2012 Sahni et al. ................... 707/749
2013/0159127 A1* 6/2013 Myslinski .................... 705/26.1

* cited by examiner

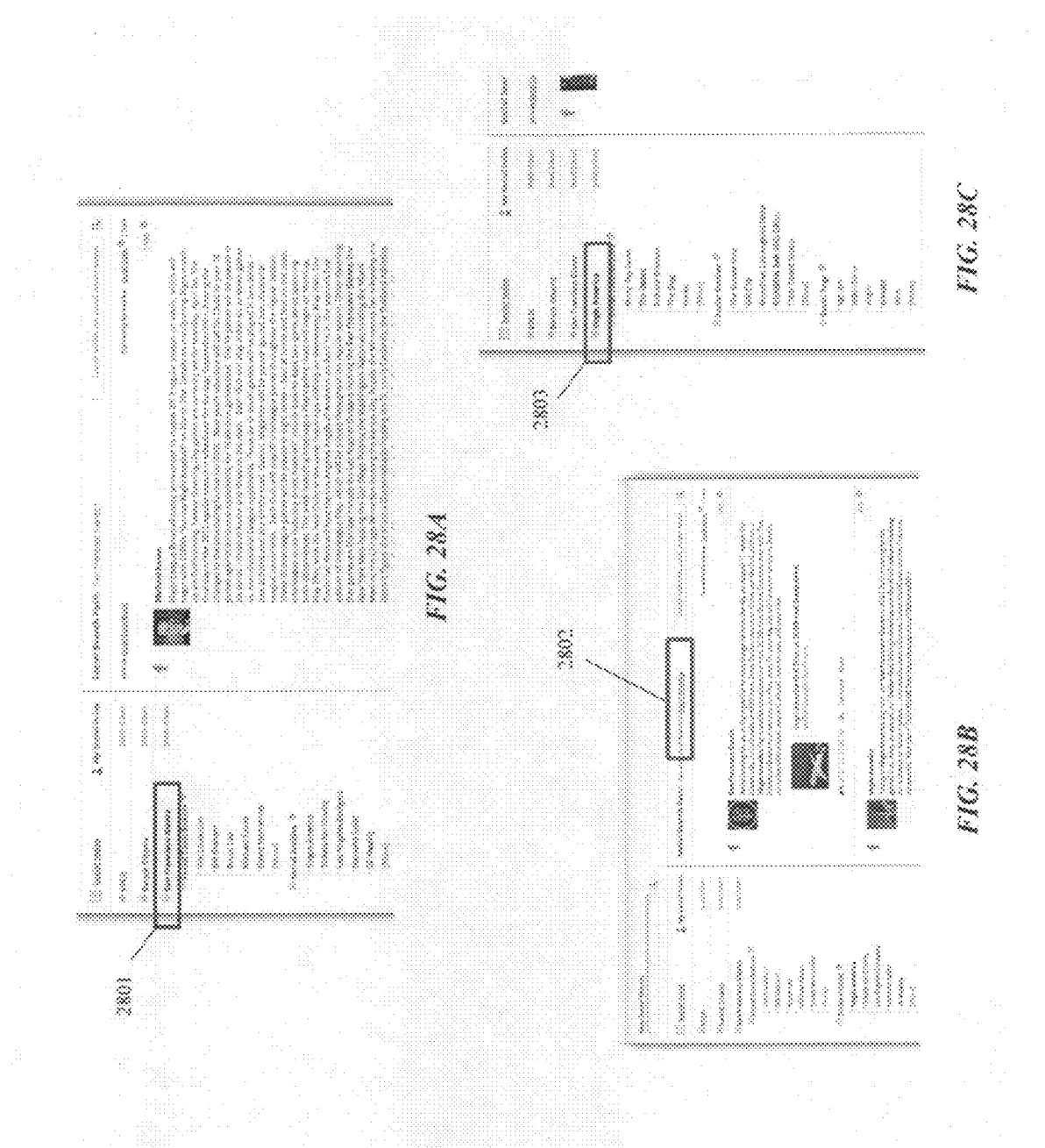

SYSTEMS AND METHODS FOR SEARCHING FOR MEDIA CONTENT

CROSS-REFERENCE

This application claims the benefit of U.S. Provisional Patent Application Ser. No. 61/562,993 ("SOCIAL MEDIA AGGREGATION SYSTEMS AND METHODS"), filed Nov. 22, 2011, and U.S. Provisional Patent Application Ser. No. 61/683,164 ("SYSTEMS AND METHODS FOR SEARCHING FOR MEDIA CONTENT"), filed Aug. 14, 2012, which applications are entirely incorporated herein by reference.

BACKGROUND

Media refers to communication tools used to store and deliver information or data, and includes but is not limited to mass media, multimedia, news media, published media, hypermedia, broadcast media, advertising media, social media (i.e., media disseminated through social interaction) and/or other types of media. Media can be delivered over electronic communication networks. Media communications can include digital media (i.e., electronic media used to store, transmit, and receive digitized information). Media includes privately communicated information or data, publicly communicated information or data, or a combination thereof.

Social media may refer to the use of web-based and mobile technologies to turn communication into an interactive dialogue. Social media are media for social interaction, as a superset beyond social communication. Social media includes web-based and mobile technologies which may or may not be associated with social networks. For example, social media such as blogs may not be associated with a social network. Social media includes privately communicated information or data, publicly communicated information or data, or a combination thereof. Currently there are multiple social networks that enable users to post content. Some of these networks are activity specific, focusing on having users provide one type of information. Other social networks attempt to be more holistic, allowing users to provide information relating to multiple types of information. Because the utility of a social network platform relies upon its user base in addition to the functionality it allows, it is common for users to have accounts with a plurality of social media platforms so that they can connect with different groups of contacts. For example, users can have Facebook® and LinkedIn® accounts. There has been a proliferation of social media platforms, each of which allows a user to perform similar functions. Each of these networks provides a user with access to a fraction of their overall social network. Accessing each of these networks in series is a time consuming and odious task for many users. Users accessing social media platforms through a mobile device are faced with additional problems, such as form factor-limited input devices and limited bandwidth. Social media platforms do not readily communicate with each other, and may even prevent a user from updating content from other networks.

Serving the vast quantity and diversity of public and/or private media (e.g., social media) to users in a meaningful and efficient way remains a challenge.

SUMMARY

Recognized herein are various limitations associated with serving media content. Further recognized herein are various limitations associated with serving social media content. For example, some social media aggregators currently available do not permit a user to seamlessly and intuitively organize (or aggregate), filter and/or search social media content by social contributor, social entity or social tag. In some circumstances, a user has to review a great amount of media content to find content of interest. Accordingly, recognized herein is the need for systems and methods that automatically, seamlessly and intuitively organize (or aggregate), filter and/or search social media based on user-selected content, including social entities.

This disclosure provides systems and methods for establishing a relationship between media content, such as words and phrases, and users and/or entities that use them. Such media content may, for example, be used on a system provided by a social media provider (e.g., Facebook®, Google+®). With the relationship established, systems provided herein enable users to view and/or search such media content based on various relationships between the media content and users and/or entities that use them.

This disclosure provides systems and methods for serving media content. Systems and methods provided herein can aggregate media content (e.g., social media content), and generate a relationship between media content for display to a user. The relationship can be a multi-dimensional relationship.

In some examples, a multi-dimensional relationship between media content can be generated and media content can be presented to a user in a manner that enables the user to view the media content across multiple dimensions. For example, text, image and/or video information can be presented to a user across multiple dimensions, such as tags, network entities and network contributors.

In some embodiments, systems and methods for serving social media content are disclosed. A method for serving social media content may include providing a relationship between a keyword search and social entities, social contributors and/or social tags. In some cases, a system for facilitating methods of the disclosure, as part of a semantic analysis, searches for and finds words or phrases that social contributors and/or social entities use the most, and creates a social index that is based on the search and the relationships between or among social entities, social contributors and/or social tags.

An aspect of the disclosure provides a method for searching for media content over a network, comprising (a) conducting, with the aid of a computer processor, a search for one or more media content over the network, wherein the search is directed to a search string, and (b) providing results of the search of (a). The results can include one or more media content that are provided based on a relationship between the search string and a tag and/or network user associated with an individual media content of the one or more media content revealed upon the search.

Another aspect of the disclosure provides a method for providing social media content to a user by social entity, social contributor or social tag. The method comprises collecting social media content from one or more social media providers and storing the social media content in a memory location. Next, with the aid of a processor operatively coupled to the memory location, a social stream from the stored social media content is generated. With the aid of a processor, at least a portion of the social stream is grouped by social entity, social contributor or social tag, thereby forming grouped social media content. At least a portion of the grouped social media content is then presented to the user. The grouped social media content is presented to the user on the basis of social entity, social contributor or social tag.

Another aspect of the disclosure provides a system for aggregating social media content. The system comprises a communications interface operatively coupled to one or more social media providers, and a memory location having machine executable code implementing a method. In some embodiments, the method comprises collecting, with the aid of the communications interface, social media content from the one or more social media providers; generating, with the aid of a processor, a social media stream from the collected social media content; grouping, with the aid of a processor, at least a portion of the social stream by social entity, social contributor or social tag, thereby forming grouped social media content; and presenting at least a portion of the grouped social media content to the user, the grouped social media content presented to the user on the basis of social entity, social contributor or social tag. In an embodiment, the system further comprises a graphical user interface for presenting at least a portion of the grouped social media content to the user.

Another aspect of the disclosure provides a computer-implemented method for searching social media content, comprising (a) receiving, from a user, a request for a search of social media content, wherein the search is directed to a search term selected by the user; (b) conducting a search of social media content in a database of social media content, wherein the search of social media content is directed to the search term, and wherein the database includes social media content aggregated from one or more social providers; (c) grouping, with the aid of a processor, at least a portion of the results of the search of (b) by social entity, social contributor and social tag, thereby forming grouped search results; and (d) providing, on a graphical user interface of the user, at least a portion of the grouped search results.

Another aspect of the disclosure provides method for establishing relationships between social entities, social contributors and/or social tags, comprising generating a social stream comprising social media content, and grouping the social stream by social entity, social contributor and social tag.

Another aspect of the disclosure provides a method for presenting a social stream on a graphical user interface of a user, comprising conducting a search for social media content of or related to a social contributor and/or social entity, and presenting one or more results of the search in a social stream on a graphical user interface of the user, wherein the one or more results are sorted based on a social score associated each of the social contributor and/or social entity.

In another aspect, the disclosure provides a computer-implemented method for providing social media content, comprising: (a) collecting social media content from one or more social media providers and storing the social media content in a memory location; (b) generating, with the aid of a computer processor operatively coupled to the memory location, a social stream from the stored social media content; and (c) grouping, with the aid of a computer processor, at least a portion of the social stream by social entity, social contributor and/or social tag, thereby forming grouped social media content, wherein the grouped social media is formed by establishing relationships between social entities, social contributors and/or social tags.

Another aspect of the disclosure provides a system for providing social media content, comprising: (a) a communications interface operatively coupled to one or more social media providers; and (b) a computer processor coupled to the communications interface, wherein the computer processor is programmed to execute machine executable code implementing a method. The method comprises: (i) collecting, with the aid of the communications interface, social media content from the one or more social media providers; (ii) generating, with the aid of the computer processor, a social stream from the collected social media content; (iii) grouping, with the aid of the computer processor, at least a portion of the social stream by social entity, social contributor and/or social tag, thereby forming grouped social media content; and (iv) presenting at least a portion of the grouped social media content to a user, the grouped social media content presented to the user on the basis of social entity, social contributor and/or social tag.

In another aspect, the disclosure provides a computer-implemented method for searching social media content, comprising: (a) receiving, from a user, a request for a search of social media content, wherein the search is directed to a search term selected by the user; (b) conducting, with the aid of a computer processor operatively coupled to a database of social media content, a search of social media content in the database, wherein the search of social media content is directed to the search term, and wherein the database includes social media content collected from one or more social providers; (c) grouping, with the aid of a computer processor, at least a portion of one or more results of the search of (b) by two or more social dimensions, thereby forming grouped search results; and (d) providing, on a graphical user interface of the user, at least a portion of the grouped search results.

Another aspect of the disclosure provides a computer-implemented method for searching for social media content over a network, comprising: (a) conducting, with the aid of a computer processor, a search for one or more social media content over the network, wherein the search is directed to a search string; and (b) providing results of the search of (a), the results having one or more social media content that are provided based on relationships between the (i) search string and a tag and (ii) the search string and a network user associated with an individual social media content of the one or more social media content revealed upon the search.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIGS. 28A-C show example screenshots of a GUI illustrating relational dimensionality.

DETAILED DESCRIPTION

Figure 1:
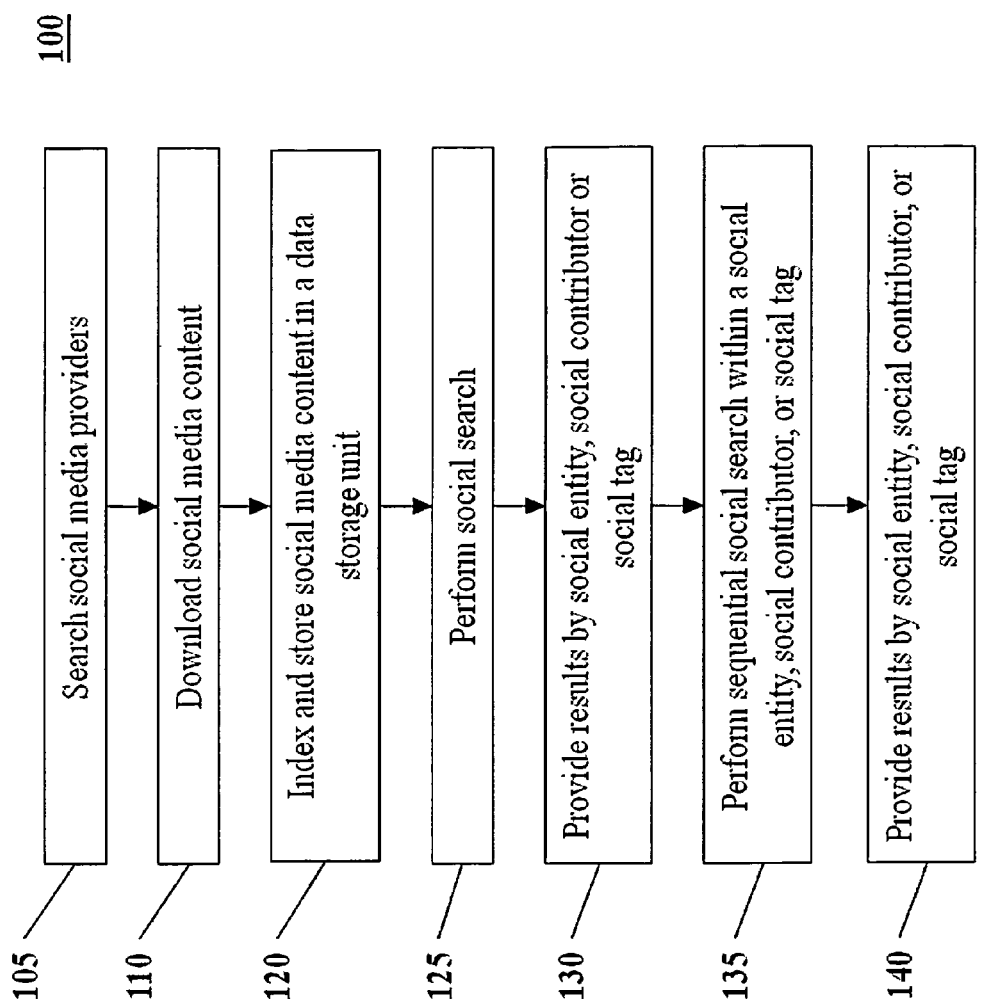
FIG. 1 shows a method for collecting social media content, in accordance with an embodiment of the invention.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed in practicing the invention.

The term "media provider," as used herein, generally refers to a service that stores or otherwise provides media content. A media provider may be a "social media provider," which generally refers to a service that stores or otherwise provides social media content. A media provider can turn communication into an interactive dialogue. Some media providers, such as social media providers, can use web-based and mobile technologies to provide such interactive dialogues.

The term "media content," as used herein, generally refers to textual, graphical, audio and/or video information (or content) on a computer system or a plurality of computer systems. In some cases, media content can include uniform resource locators (URL's). Media content may be information provided on the Internet or one or more intranets. In some cases, media content is social media content, which can include textual, graphical, audio and/or video content on one or more social media networks. In some cases, media content is social media content, which can include textual, graphical, audio and/or video content on one or more web sites, blog sites or other web-based pages. Social media content may be related to a social entity or social contributor.

The term "network stream," as used herein, generally refers to a display, such as an aggregate display, of the media activities of an entity or person that can be searched, grouped and filtered. A network stream may be a "social stream," which generally refers to a display, such as an aggregate display, of the social media activities of an entity or person that can be searched, grouped and filtered.

A network stream may be updated in real-time or at a given time point or interval. For example, a network stream is updated continuously. As another example, a network stream is updated manually. As another example, a network stream is updated every at least one microsecond, one millisecond, one second, ten seconds, one minute, or ten minutes.

The term "network entity," as used herein, generally refers to an entity, such as a company, group or organization, that may be associated with media content. A network entity may be a "social entity" (also referred to as "Social Entity" herein), which is a network entity associated with social media content. A network entity may be a company that distributes media content over the Internet. A social entity may be a company that distributes social media content with the aid of a service provided by a social media provider (e.g., Facebook®). In some cases, an entity may be a network entity as well as a social entity. A social search engine indexes an entity's social media initiatives and subsequently displays contributors', users' and entities' posts that mention such entity in their social media activities. In an example, a user searches "Yale" and results display all social media by "Harvard" that mentions Yale.

The term "network contributor," as used herein, generally refers to a user or person that has contributed media content on a network, such as the Internet and/or an intranet. A network contributor may be a "social contributor" (also referred to as "Social Contributor" herein), which is a user that has contributed social media content. In some cases, a person can be a network contributor as well as a social contributor. The social media content may be of or related to a social entity. In an example, a user searches "Yale" and the results display "Professor Jones"—a Yale professor—and all of his social media that mentions Yale.

The term "tag," as used herein, generally refers to words or text strings that are used by network entities and/or network contributors within, or at least within, a given percentage or frequency of usage. For instance, a tag can be a word or text string that is most utilized by network entities and/or network contributors. A tag may be a "social tag" (also referred to as "Social Tag" herein), which generally refers to the most utilized words or text strings that are used, such as by a user, in the user's social media activities (e.g., Facebook® activities). In an example, a user searches "Yale" and views the most used words by Yale in its social media activities: "Financial Aid," "architecture" and "basketball."

The term "network," as used herein, generally refers to a computer network. A network can include the Internet, one or more intranets, or both. A network in some cases includes a computer environment for the distribution of media content. A network can include a computer environment provided by a media provider, such as a social media provider.

Some embodiments provide systems and methods for establishing relationships between media content and users and/or entities that use, or make reference to, the media content. In some examples, the media content is social media content, and a relationship between the media content and social entities and/or social contributors may be established. In other examples, the media content may be Internet or World Wide Web ("web") content, and the relationship between the media content and users and/or entities that use, or make reference to, the media content may be established. Such relationships may be presented to a user on a user interface, such as a graphical user face, of a computer display ("display") of an electronic device of the user.

Some embodiments provide a method for searching for media content over a network, comprising conducting, with the aid of a computer processor (also "processor" herein), a search for one or more media content over the network. The search is directed to a search string. The search string may include one or more tags. The results of the search are then provided. The results include one or more media content, which can be provided in accordance with a relationship between the search string and a tag, network contributor and/or network entity associated with an individual media content of the one or more media content revealed upon the search.

Some embodiments provide a social search engine that indexes social media activities or content and subsequently facilitates the strategic searching, filtering, and displaying of such social media activities or content by entity, contributor, and tag. The social search engine can index the World's social media. The social search engine can include one or more computer systems having memory locations for executing machine readable code for implementing various methods for collecting or aggregating social media content, as provided herein. The social search engine can be adapted (e.g., programmed or otherwise configured) to a search engine for any media type. Thus, any description of a social search engine herein can apply to any search engine for media content.

The social search engine can include a data mining module for searching the Internet and/or an intranet to collect social media content of or related to a user. The data mining module can also search for and gather social media content that is related to a social entity, social contributor or social tag specified by the user.

In accordance with the present disclosure, users may refer to people ("contributors"). Any features of the methods and systems described herein as relating to a user may also relate to an entity, Thus, a user (also referred to as "network user" herein) can be understood in a broader sense to include both contributors and entities. In some embodiments, a network user may refer to a social contributor and/or a social entity.

Some embodiments provide a system for collecting and aggregating social media content to be searched by a user. The social media content can be provided to a user by way of a social stream. In some cases, the social stream includes an aggregate collection of social media content. The social stream can be an aggregate display of all social media content retrieved by the system, or a subset, such as a social stream that relates to a particular social entity or social contributor, or a social stream that is directed at a particular term. The social stream can be categorized, such as by social entity, social contributor, or social tag.

In some cases, a social stream of a social entity can be categorized and displayed by social entity, social contributor or social tag. This can permit a user to determine which social entities, contributors, and/or tag has (or have) mentioned the social entity in the social stream.

In some cases, a social stream of a social contributor can be categorized and displayed by social entity, social contributor or social tag. This can permit a user to determine which social entities, contributors, and/or tag has (or have) mentioned the social contributor in the social stream.

Systems and methods provided herein can permit users to automatically aggregate or collect and filter social media content. In some cases, the aggregated social content can permit multi-dimensional views of social streams, such as across a social entity dimension, social contributor dimension, or social tag dimension. Social entities, social contributors and social tags are also referred to as "dimensions" or "social dimensions" herein. In some embodiments, a social dimension can refer to a particular type of dimension associated with social media content, while a dimension can refer to a dimension associated with any type of media content. The dimensions can be orthogonal dimensions—that is, dimensions that are mutually exclusive. As an alternative, some of the dimensions can be inclusive of other dimensions. For example, the social entity dimension can overlap at least to some extent with the social contributor dimension.

Systems and methods of the disclosure can aggregate social media content of a single social media provider (e.g., Facebook®), or multiple social media providers (e.g., Facebook® and Google+®). In an example, systems of the disclosure can aggregate Facebook® wall posts. In another example, systems of the disclosure can aggregate Facebook® and Google+® content. Accordingly, social media content can be aggregated across a single social media provider or across a plurality of social media providers.

Any system or method of the disclosure referred to as "social", or described in connection with serving social media, may also be applied to any other media type(s). Thus, systems and methods described herein are understood to apply to any media content and are not to be limited to social media content.

Methods for Serving Social Media Content

An aspect of the disclosure provides a method for providing social media content to a user by social entity, social contributor or social tag. Methods described herein in the context of social media can apply to any media type(s) and are not limited to social media. The method comprises collecting social media content from one or more social media providers and storing the social media content in a memory location. With the aid of a processor operatively coupled to the memory location, a social stream from the stored social media content is generated. Next, with the aid of a processor, at least a portion of the social stream is grouped by social entity, social contributor or social tag to form grouped social media content. At least a portion of the grouped social media content is presented to the user. The grouped social media content is presented to the user on the basis of dimensions such as social entity, social contributor or social tag.

FIG. 1 shows a method 100 for aggregating social media content, in accordance with an embodiment of the invention. The method 100 can be implemented by a computer system (see, e.g., FIG. 2) for accessing social media providers, and downloading and indexing social media content from the social media providers. The computer system can include a social search engine for enabling a user to search raw and aggregated social media content, such as social streams.

With reference to FIG. 1, in a first step 105, the system accesses various social media providers. Next, in a second step 110, the system downloads social media content. In some embodiments, the system downloads selected or user-specified content, such as content that is directed at predetermined social entities (e.g., Yale University), social contributors (e.g., Professor Jones), or social tags, which may include a search string. The system can access a social media provider and download material from select social entities and/or social contributors specified on a system profile of a user. In an example, a user desiring to have certain social media content aggregated can have a profile that includes social entities, social contributors and/or social tags specified by the user. In some cases, the profile of the user displays a social stream that is categorized by social entity, social contributor, or social tag.

In some embodiments, the system permits a user to add a social entity, social contributor, or social tag from a social stream to a profile page (e.g., web site) of the user, such as a profile page hosted by a social media provider (e.g., Facebook®). The user in some cases can select which social entity, social contributor, or social tag is added to the user's profile page.

In other embodiments, the system downloads any new content, such as new posts, status updates or profile content. The new content can be material that has been added in relation to a certain point in time, such as a prior download. In some situations, the system does a differential download, which supplements downloaded material with any new material.

In some situations, the system downloads social media content and generates a social media stream. The social media stream can include social media content of or relating to a particular social entity or contributor from one or more social media providers. In an example, the system downloads social media content relating to the social entity "Yale University" from Facebook® and LinkedIn®.

Next, in a third step 120, the system indexes and stores the social media content in a data storage unit of the system. The data storage unit can be accessed and searched by the social search engine of the system. In some cases, the system indexes and stores the social media content in a database of the system, such as a relational database. The social media content can be indexed using clustered or non-clustered indexing, to name a few examples.

Social media content can be stored in the data storage unit by dimensions. Social media content can be stored in the data storage unit by social entity (e.g., company, institution, or organization), social contributor (e.g., a person), and/or social tag (e.g., word). In some embodiments, social media content relationships may be stored as properties of dimensions.

In some situations, the social search engine can search the database with one or more terms directed at social entities, social contributors or social tags. The social search engine can implement various search algorithms to facilitate the search. In some embodiments, the social search engine implements an incremental search algorithm, heuristic search algorithm, or incremental heuristic search algorithm to conduct the search.

In some situations, the third step 120 can be precluded and the system can search social media providers in real time, such as upon request from a user. The system can implement search engine indexing to facilitate searching and retrieving social media content. The system can index the World's social media, or index social media from various countries, cities or localities, or index social media from given companies or entities. The system can implement indexing upon request of a user and/or without request of a user. In some instances, the system conducts a search of various social media providers upon request from a user. Such a search can be directed at one or more social entities, social contributors and/or social tags.

The system can provide the user a social stream, which is an aggregate display of social media activities of an entity or social contributor. The social stream can include social media content from various social media providers. In an example, a social stream includes social media content for the social entity "Yale University" retrieved from Facebook and Twitter. The social stream in such a case can include Facebook "wall" posts and status updates, and Twitter "tweets."

For instance, in a fourth step 125 the system performs a search directed at a social entity, social contributor or social tag. The system can perform a search of a social stream generated by the system from content retrieved from one or more social media providers, or download content directed at a predetermined social entity, social contributor or social tag. Next, in a fifth step 130, the system provides the results of the search to a user. In some cases, the system provides the results of the search on a user interface of the system, such as a graphical user interface (GUI), on a display of the user (e.g., computer display, iPhone display, iPad display). The results can be provided by social entity, social contributor, or social tag. In an example, the results are displayed by social entity (e.g., Yale University, Harvard University, Brown University). In another example, the results are displayed by social contributor (e.g., Professor Smith, Steve Harvey).

In some cases, the system can perform a sequential social search. The sequential social search may be performed upon request by a user. With reference to FIG. 1, in a sixth step 135, the system performs a sequential social search within a social entity, social contributor, or social tag. Next, in a seventh step 140, the results of the sequential social search are provided by social entity, social contributor, or social tag. The user may then perform additional sequential social searches.

In some embodiments, the system can retrieve content from social media providers in a batch-wise fashion or a continuous fashion and store the content in a data storage unit of the system. The system can then search the stored social media content based on predetermined search strings or criteria. In some situations, the systems conducts a search directed at one or more social entities, social contributors, social tags, or a combination thereof selected by a user, and provides the results of the search for view by the user.

In some situations, the system provides a social stream that displays social content as a function of time (e.g., the latest social content appears at the top of the list). A user can subsequently conduct a search of the social stream directed at a social entity, social contributor or social tag. In an example, a user can conduct a search of the social stream for the most utilized words(s) associated with a social entity or social contributor.

Systems of the disclosure can enable a user to search social media content on the basis of a search criterion (e.g., a search string having one or more keywords), and view the results of the search on a user interface (UI) of the user, such as a graphical user interface (GUI). The search can be conducted against one or more databases of aggregated social media content. The one or more databases can be populated using systems and methods of the disclosure.

Figure 18:
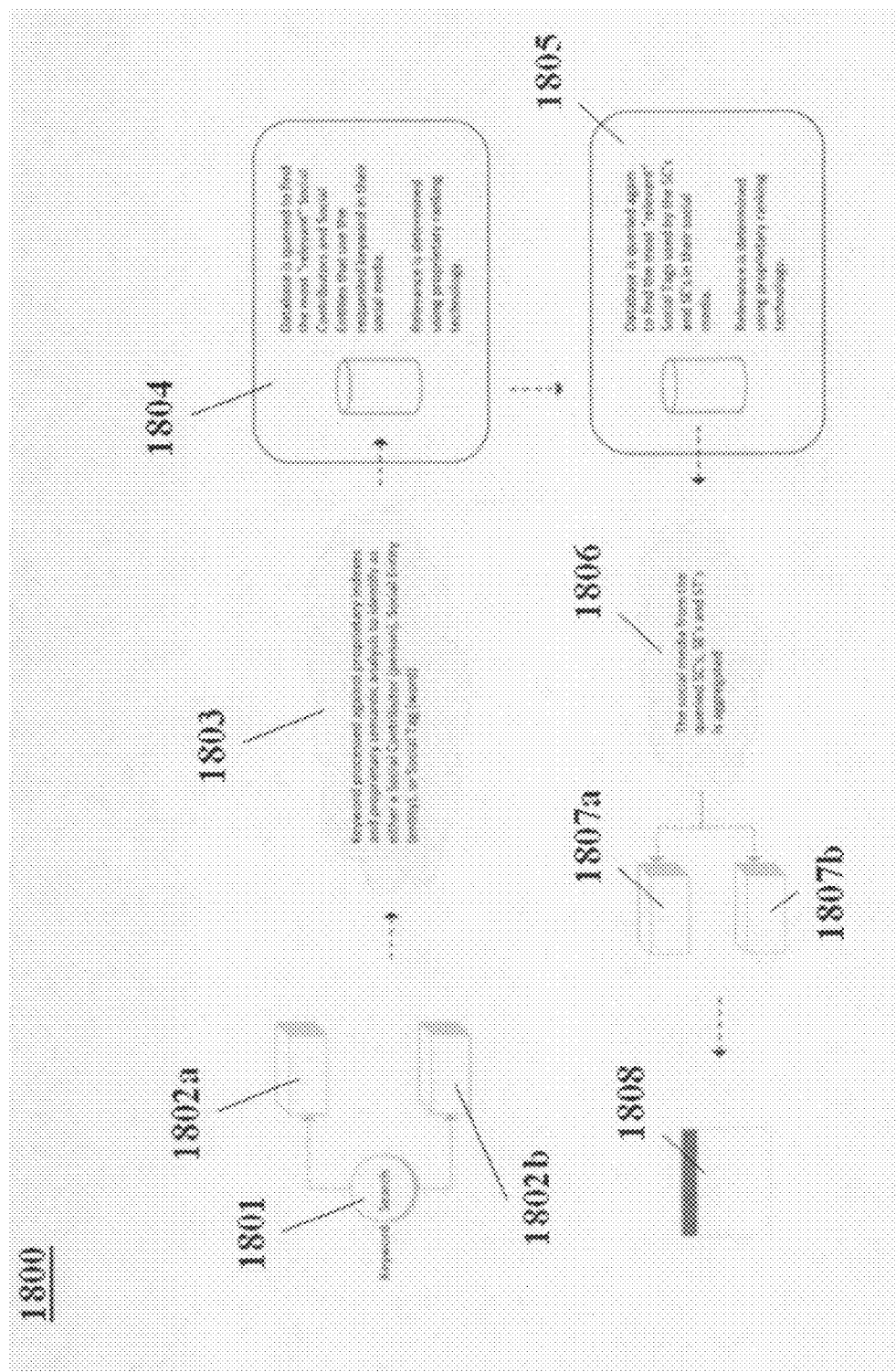
FIG. 18 shows a workflow for providing social media content.

FIG. 18 shows a workflow 1800 for providing social media content. The workflow 1800 may be implemented with the aid of systems of the disclosure, such as the computer system 205 of FIG. 2 (see below). In a first operation 1801, a user conducts a search using a given search criterion having a keyword or phrase. The search criterion may be provided to a web application 1802a or mobile application 1802b of the system. Each of the applications 1802a or 1802b may be coupled to the system. In a second operation 1803, the search criterion is processed against one or more indexes and semantic analysis to identify the search criterion as either a social entity (e.g., a group or company), social contributor (e.g., a person), or a social tag (e.g., a word).

Next, in a third operation 1804, a database of the system is queried to find the most relevant social entities or social contributors, or social entities and social contributors, that use the keyword or phrase of the search criterion. Relevance may be determined using a ranking algorithm. In some examples, relevance is determined using a social score computed by the system. For instance, a first user that uses a given keyword more often than a second user may have a higher social score than the second user. This operation may provide the relationship between the keyword or phrase and the social entities and/or social contributors that use the keyword or phrase in their social media.

In some cases, relevance is determined using a ranking algorithm. Such ranking can enable the system to prioritize social media results. In some embodiments, the most relevant social entities and social contributors are determined by first determining a social score of each social entity and social contributor revealed in the search of the third operation 1804. The social score is determined by calculating, for each social contributor and social entity that is revealed in the third operation 1804, a social engagement score and a social post score. The social engagement score can be related to the social relevance of the person. The social engagement score is determined by the number of friends, fans, followers, or other measurement (or metric) that assesses a user's importance. For example, a user (or entity) on Facebook® may have one hundred friends. In such a case, the social engagement score for such user (or company) may be one hundred. The system also computes a social post score, which can be determined based on the amount of interaction of any social post by a user or entity. In some cases, a user's or entity's social post score is a function of the number of "likes", "dislikes" and "comments". The number of likes, dislikes and comments may each be weighted. For example, if a user's social post has one hundred likes and twenty comments, then the system may weigh the value of each of the number of likes and comments and compute a social post score that is a function of the number of likes and comments. In an example, for a user having one hundred likes and twenty comments, the system computes a social post score of fifty.

In some examples, the system calculates the social post score by aggregating the number of likes, dislikes and comments of a user. The system may multiply each of the number of likes, dislikes and comments by a scaling (or weighting) factor. The number of dislikes may be subtracted from the number of likes and comments. In some cases, the system weighs likes higher than comments, and the scaling factor for likes may be greater than the scaling factor for comments. In some examples, a user's social post score is as follows:

$$\text{Social post score} = A \times N_{likes} + B \times N_{comments} - C \times N_{dislikes}$$

In the above formula, A, B and C are scaling factors for likes, comments and dislikes, respectively, $N_{likes}$ is the number of likes, $N_{comments}$ is the number of comments and $N_{dislikes}$ is the number of dislikes.

Next, the system calculates a total social score by adding the social engagement score and social post score. For example, a user may have one hundred fans and the user's social post score may be fifty, as estimated by the systems based on the number of likes, dislikes and comments. Such user's total social score is one hundred and fifty. For instance, the social post score can be directly related to the number and/or frequency of posts by a social entity or social contributor. In an example, a first user that posts once a day may have a higher social post score than a second user that posts once a week.

In some embodiments, the social engagement score approximates the social importance of a social contributor. The social post score approximates the number of posts a user has provided across one or more social media providers. A user that posts on a daily basis (e.g., once a day) may have a higher social post score than a user that posts on a monthly basis (e.g., once a month). In an example, a user that has a high social engagement score may have a relatively low total social score if the user has a low social post score.

Next, in a fourth operation 1805, a database is queried to find the most relevant social tags used by the social entities and/or the social contributors revealed in the third operation 1804. This operation may provide the relationship between the keyword or phrase and the most relevant words used within the social media of the social contributors and/or social entities revealed in the third operation 1804. The database of the fourth operation 1805 may be the same as the database of the third operation 1804.

The results of the search of the fourth operation 1805 may be ranked or otherwise prioritized. The results may be ranked on the basis of relevance, which may be determined based, at least in part, on the social score of a given social tag. The social score in some cases is related to the social engagement score of a social entity or social contributor that uses the social tag (e.g., word) in their social media content (e.g., posts) and the social post score of the actual social post. In some cases, the social score is the sum of the social engagement score and the social post score. One or both of the social engagement score and the social post score may each be weighted by a scaling factor. Alternatively, the social score can be the social engagement score multiplied by the social post score.

The database(s) accessed in the third operation 1804 and fourth operation 1805 may be relational databases. The database(s), in some cases, are configured to connect the relationship between a given keyword or phrase and social entities and/or social contributors that use the given keyword or phrase. In addition, the database(s) (or a subset of databases) may connect the relationship between a given keyword or phrase and the most relevant words used within the social media of the social contributors and/or social entities.

With continued reference to FIG. 18, in a fifth operation 1806, the system aggregates social media content from the social entities, social contributors and social tags revealed in the searches in the third 1804 and fourth 1805 operations. The aggregated social media content may be stored in a data repository, such as a database that can be dedicated for the storage of social media content. Next, data is returned to the web application 1807a or mobile application 1807b.

Next, in a sixth operation 1808, social results and relevant social entities, social contributors and social tags are displayed to the user on a user interface, such as a graphical user interface (GUI), of an electronic device of the user. The user may elect to drill-down on a given social entity, social contributor, or social tag to review other relationships.

Social results can be displayed on the GUI on the basis of social score. In an example, a first social result having a higher social score than a second social score is displayed higher in a list of social results than the second social result.

The system can permit the user to filter social results based on social score. For example, the user may wish to view social results having a social score above a threshold value. The user can input the threshold value in an input field of the GUI and the system can filter the results and provide the user the filtered social results.

Systems for Serving Social Media Content

Another aspect of the disclosure provides a system for providing social media content to a user. The system can be configured (e.g., programmed) to aggregate or collect social media content. Systems described herein in the context of social media can apply to any media type(s) and are not limited to social media. The system comprises a communications interface operatively coupled to one or more social media providers, and a memory location having machine executable code implementing methods provided herein. In some embodiments, the methods comprise collecting, with the aid of the communications interface, social media content from the one or more social media providers, and generating, with the aid of a processor, a social media stream from the collected social media content. At least a portion of the social stream is grouped by social entity, social contributor or social tag to form grouped social media content. At least a portion of the grouped social media content is presented to the user. The grouped social media content can be presented to the user on the basis of social entity, social contributor or social tag.

In some embodiments, the system comprises a user interface for presenting at least a portion of the grouped social media content to the user. The user interface in some cases is a graphical user interface.

Figure 2:
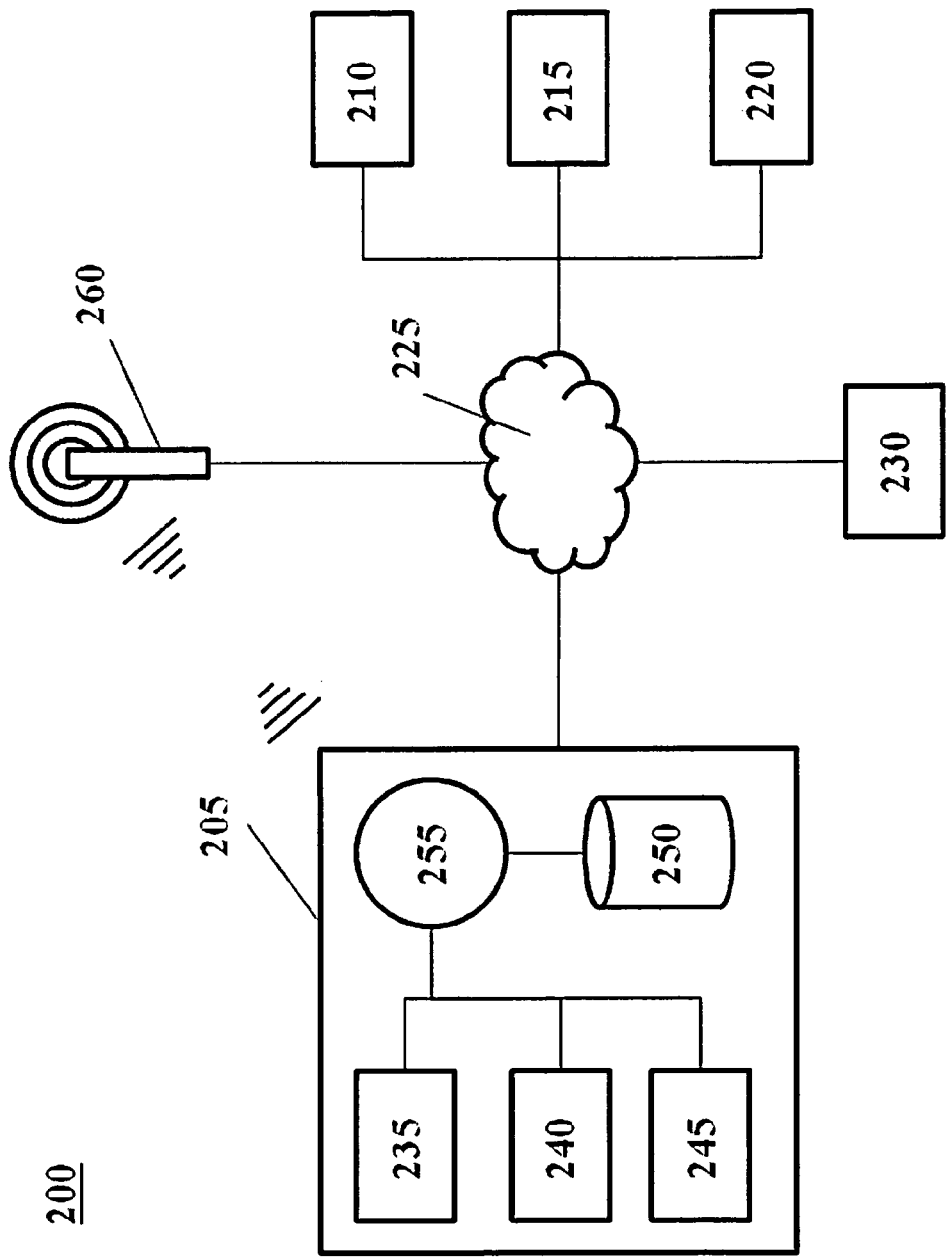
FIG. 2 shows a system for collecting social media content, in accordance with an embodiment of the invention.

FIG. 2 shows a system 200 for implementing the methods of the disclosure in accordance with an embodiment of the invention. The system 200 may be adapted to serve social media content. The system 200 includes a computer system 205 that is in communication with a first social media provider 210, a second social media provider 215 and a third social media provider 220 with the aid of a network 225. The network 225 can be the Internet or an intranet that is operatively coupled to the Internet. In some contexts, the network 225 can be referred to as the "cloud." A user 230 employs a computer system of the user to create, edit and remove social media content on the social media providers 210, 215 and 220. The computer system of the user 230 can be a personal computer (PC), a terminal, a server, a slate or tablet PC (e.g., Apple® iPad®, Samsung Galaxy Tab), or a smart phone (e.g., Apple® iPhone®, an Android®-based phone). The social media providers can be, for example, Facebook®, LinkedIn® and Twitter®. The social media providers can include overlapping content and non-overlapping content. For example, if the first social media provider 210 is Facebook and the second social media provider 215 is LinkedIn, the first social media provider 210 can include content relating to the social activities of the user 230, and the second social media provider 215 can include content relating to the job history and current employment of the user 230.

The computer system ("system") 205 includes a memory location 235, a communications interface 240, a display interface 245 and, in some cases, a data storage unit 250, which are all operatively coupled to a processor 255, such as a central processing unit (CPU). The memory location 235 may include one or more of flash memory, cache and a hard disk.

In some situations the memory location 235 is read-only memory (ROM) or random-access memory (RAM), to name a few examples.

The data storage unit 250 can store social media content collected by the system 205. The data storage unit 250 can include one or more hard disks and other memory locations which are configured to store and, in some cases, index social media content. The data storage unit 250 can include one or more hard disks, memory and/or cache for data transfer and storage. The data storage unit 250 can include one or more databases, such as a relational database.

The communications interface 240 includes a network interface for enabling the system 200 to interact with the network 225, which may include an intranet, including other systems and subsystems, and the Internet, including the World Wide Web. In some cases, the system 205 further includes a data warehouse for storing information, such as user information (e.g., profiles) and results. In some cases, the data warehouse resides on a computer system remote from the system 205. In some embodiments, the system 205 may include a relational database and one or more servers, such as, for example, data servers.

The system 205 may include one or more communication interfaces or ports (COM PORTS), one or more input/output (I/O) modules, such as an I/O interface. The processor 255 may be a central processing unit (CPU) or a plurality of CPU's for parallel processing.

In some situations, the communications interface 240 enables the system 205 to wirelessly interface with the network 225. In such a case, the communications interface 240 includes a wireless interface (e.g., 2G, 3G, 4G, long term evolution (LTE), WiFi, Bluetooth) that brings the system 205 in wireless communication with a wireless access point 260 that is in communication with the network 225.

The system 205 may include a social search engine that indexes social media content and facilitates the strategic searching and filtering of social media content by entity, contributor and tag. In some situations, via the social search engine, an aggregate display of the social media activities of an entity or person is provided, which can be searched and filtered. The search engine can permit a user to filter within any one of social entity, social contributor, or social tag to then get a revised set of social entities, social contributors, or social tags based on various search terms or strings. In some cases, a user can further filter each social search stream result by date (e.g., the system 205 filters and displays results chronologically from the most recent data), content (e.g., the system 205 filters and displays results by content within an individual social media, such as, for example, text, audio/video, images and URL's), user rating (e.g., the system 205 filters and displays results by the highest rated, as determined by users) and/or sharing (e.g., the system 205 filters and displays results by most shared social media content among users).

The system 205 can permit a user to group and sort search results. In some embodiments, search results can be grouped by social entity, social contributor or social tag. Search results may be sorted by various fields, such as date (e.g., date retrieved by the system, date posted on a social provider), social entity, social contributor, and/or social tag, to name some examples.

For example, the system 205 can access the social media providers 210, 215 and 220 to search for social media content that is of or related to an entity (e.g., company, school), contributor (e.g., user) or tag (e.g., most frequently used words or text strings). In some embodiments, the system 205 accesses the social media providers and retrieves and stores social streams. The social streams may be of or related to a particular entity or contributor. The system 205 can store the social media streams in the data storage unit 250 of the system 205.

In some situations, the system 205 indexes an entity's social media initiatives and subsequently makes accessible various user and entity posts that mention the searched for entity in their social media activities. In an example, the user 230 searches "Yale," and the system 205 displays all social media content by the entity "Harvard" that mentions the entity "Yale."

The system 205 can index an entity's or user's social media initiatives and subsequently display the users and their posts that have provided social media content of or related to the entity or person. In an example, the user 230 searches "Yale," and the system 205 displays "Professor Jones"—a Yale professor—and all of Professor Jones' social media content that mentions "Yale."

The system 205 can index an entity or person's social media initiatives and subsequently display social media content (e.g., posts) having the most utilized word(s) that such person or entity used in its social media activities. In an example, the user 230 searches "Yale," and the system 205 provides the user 230 the most used words by Yale in Yale's social media activities (e.g., "Financial Aid," "architecture," "basketball," etc.).

In some situations, a user can activate the social search engine of the system 205 to display and filter a social stream by social entity, social contributor and/or social tag. Filtering can enable the user to drill down search results to get deeper results, all within the structure of the social entity, social contributor or social tag. In some situations, the system 205 presents the results of a search grouped by social entity, social contributor or social tag. The results can be provided on a display of the user, such as a graphical user interface (GUI, see below) of the display. The user can drill down from the social entity, social contributor or social tag to reveal various details of the group. In an example, a user drills down from a social entity to reveal other social entities, social contributors or social tags that have referenced the social entity.

In some embodiments, the system 205 can display search results or posts and rank the posts by content. In some cases, the system displays posts with the most content (e.g., text, images, URL's, rich media) at the top of the list. Subsequent posts from the top can be listed in the order of decreasing content. The system 205 can have software that is configured to operate on various operating systems, such as Linux-based operating systems or Windows-based operating system. The operating system can reside on a memory location of the system 205.

The system 205 can permit the user 230 to create a social page or social profile. The profile can enable the user to list various attributes and interests of the user. In some cases, a user can create a social page and select only the social stream(s) or content that the user desires to view. In an example, a user selects and receives—on a private, dedicated webpage of the user—only the social streams that the user desires to view. The system can permit the user to filter posts provided in social streams, such as by date (e.g., newest toward the top) or content (e.g., posts with the most content toward the top). In some embodiments, the social page or social profile can be used in a data feed.

Systems of the disclosure may allow the user to set preferences and/or make selections. The preferences and/or selections may be used in a feedback loop to control one or more aspects of serving social media or any other media type.

The system 205 can include administrator ("admin") functionality. In some situations, the administrator of a social stream can add or remove social contributors. For example, the admin of the social entity "Yale" can add or remove users to and from, respectively, the Yale social stream. In some cases, the admin of a social stream can add or remove social tags. For example, the admin of Yale can add any word or words to the Yale social stream, allowing any user to easily find what the admin or other user deems important.

In some cases, a user can combine all of the social media initiatives of all members of an organization into a single web page or social stream. The user can then determine which users and which social media from such user is to be published on a social stream of the organization. Such control also includes the ability to determine and publish the words, or social tags, that may promote, educate, and/or inform users in a social stream. For example, the admin for Yale, can publish "New Students" and "Endowment," which allows users to filter the entire social stream of the admin—which is inclusive of all of its social entities and social contributors—by accessing (e.g., by clicking) social tags of interest.

The system 205 can be adapted to store user profile information, such as, social media profile information. Such profile information can be stored in the data storage unit 250 of the system 205.

Aspects of the systems and methods provided herein, such as the computer system 205, can be embodied in programming. Various aspects of the technology may be thought of as "products" or "articles of manufacture" typically in the form of machine (or processor) executable code and/or associated data that is carried on or embodied in a type of machine readable medium. Machine-executable (also "computer-executable" herein) code can be stored on an electronic storage unit, such as one or more memory (e.g., ROM, RAM) or one or more hard disks. Examples of hard disks include magnetic and solid state recording media. "Storage" type media can include any or all of the tangible memory of computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD or CD-ROM, a DVD or DVD-ROM, any other optical medium, punch cards paper tape, any other physical storage medium with patterns of holes, a RAM, a ROM, a PROM and/or EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

In some cases, code that is executable by a single processor can be executed by a plurality of processors, such as in a parallel processor environment or distributed computing fashion. Code that is executable by a plurality of processors may be executed by a single processor.

In some cases, the system 205 may be configured for data mining, extract, transform and load (ETL), or spidering (e.g., Web Spidering, where the system fetches data from remote systems over a network and accesses an Application Programming Interface (API) or parses the resulting markup) operations, which may permit the system to load information from a raw data source (or mined data) into a data warehouse. In some cases, one or more credentials are provided in order to access data (e.g., one or more credentials are provided for access through an API specific to a social media platform). The data warehouse may be configured for use with a business intelligence system (e.g., Microstrategy®, Business Objects®). The media file management system can include a data mining module adapted to search for media content in various source locations, such as email accounts and various network sources, such as social networking accounts (e.g., Facebook®, Foursquare®, Google+, LinkedIn®, Twitter®, Instagram®) or on publisher sites, such as, for example, weblogs.

Social media content, such as search results and social relationships, may be presented to a user with the aid of a user interface (UI), such as a graphical user interface (GUI), on an electronic device of the user. The UI, such as GUI, can be provided on a display of an electronic device of the user. The display can be a capacitive or resistive touch display, or a head-mountable display (e.g., Google® Goggles). Such displays can be used with other systems and methods of the disclosure.

A user interface may enable a user to interact with systems of the disclosure, such as for conducting searches directed at social media content. In some situations, the user interface is a graphical user interface (GUI) having various graphical, textual, audio and video elements.

A user interface can have a search field that enables a user to input one or more search terms to be used by the system to conduct a search. The search field can include a drop-down, pull-down or other type of menu to enable a user to select, for example, commonly used words or previous search strings.

In some embodiments, the system 205 of FIG. 2 is configured to present the results of a search using a GUI on a display of the system 205 or a remote system, such as a remote system of the user 230. The results can be displayed immediately following a search by a user, and in some cases updated as new information arrives on the system 205. In some situations, results are generated on the user interface as the user inputs text into a search field of the user interface.

The user interface can include a text field to enable a user to input text (or strings) to refine the results of a search. For example, a user can initially conduct a search for a certain social entity (e.g., "Yale University") and subsequently refine the search by social tag or social contributor (e.g., "Professor Ralph).

In some embodiments, following a search query from the user 230, the system performs a search of social media content and provides the results to the user 230 on a graphical user interface on a display of the system 205 of a computer system of the user 230. The user can then filter the search results, drill down, or drill up. In addition, the GUI can enable the user to sort and group search results by various categories, such as social entity, social contributor or social tag.

In some embodiments, the user interface is a web-based user interface (also "web interface" herein) that is configured (e.g., programmed) to be accessed using an Internet (or web) browser of a computer system of the user 230 or any other system in communication with the system 205. The web interface can enable a user to search social media content and display search results by social entity, social contributor, or social tag, and to drill down or drill up from the results to view varying levels of detail.

Some embodiments provide user interfaces for enabling a user to interact with systems provided herein. In some cases, the user interfaces are graphical user interfaces.

Figure 5:
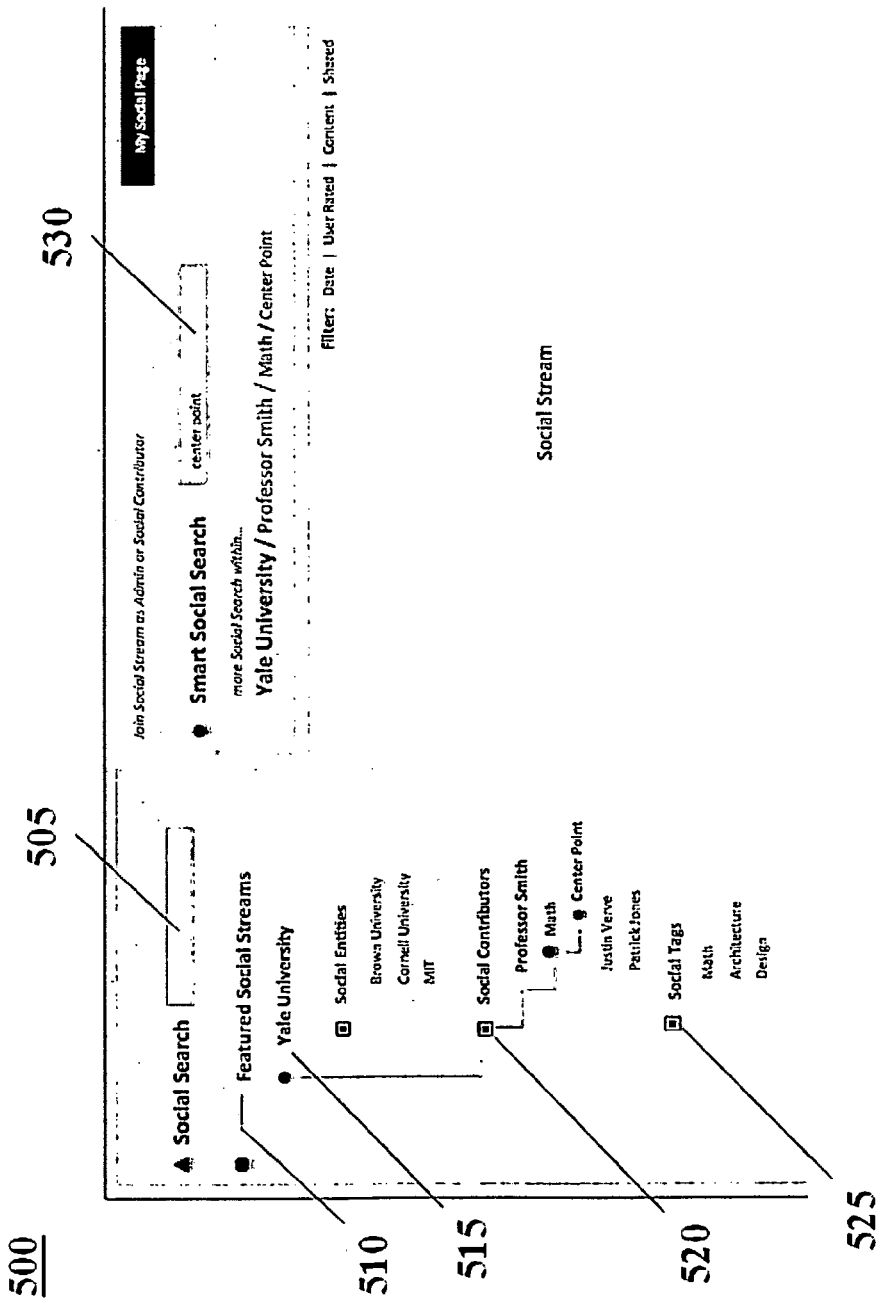
FIG. 5 shows a graphical user interface and the results of an example search, in accordance with an embodiment of the invention.

FIG. 5 shows a graphical user interface (GUI) 500 for use with systems provided herein, in accordance with an embodiment of the invention. The GUI 500 has a search box 505 for enabling a user to input search terms. Results of a search are presented in a search results area 510, which can list social entities 515, social contributors 520 and social tags 525. Social entities 515, social contributors 520 and social tags 525, as illustrated, are grouped. The grouped results can be graphically displayed in a relational tree (e.g., Yale University/Professor Smith/Math/Center Point is displayed graphically in the search results area 510, wherein Professor Smith is displayed in a Social Contributors dimension). Results of a search or a social stream can be further searched using a smart social search 530. The results can be filtered by date, user rating, content and sharing, such as by ordering the results by date, user rating, content or sharing.

The GUI 500 includes a plurality of panels. A left panel is a navigation panel that displays the search results area 510. In some cases, the navigation panel presents search results categorized by social entity, social contributor and/or social tag. A right-top panel includes the smart social search 530. A right-bottom panel displays social streams for social entities, social contributors or social tags selected by the user in the left panel.

Figure 9:
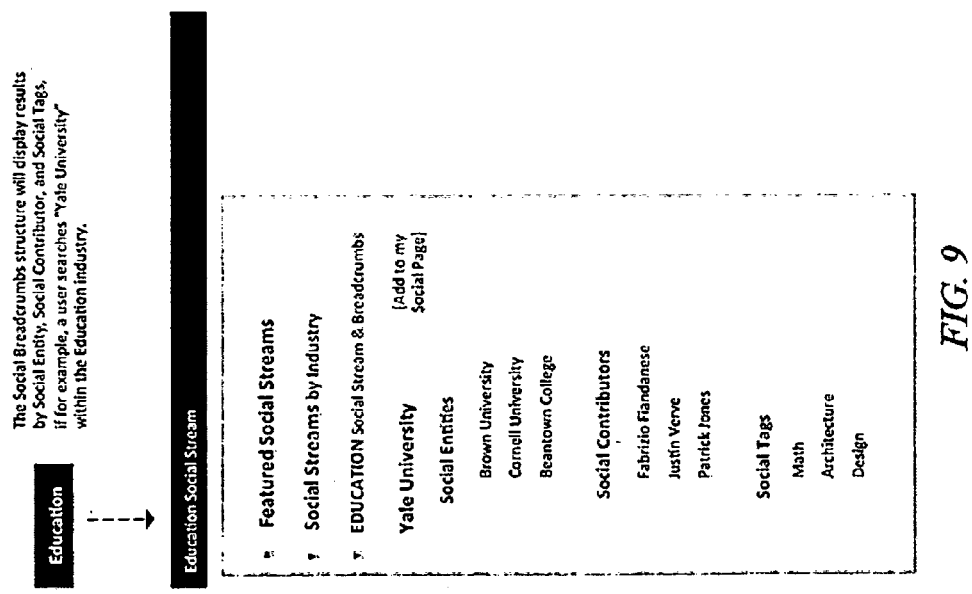
FIG. 9 shows a navigation panel of an education social stream.

FIG. 9 shows a GUI having a panel with a social stream, in accordance with an embodiment of the invention. The panel displays social breadcrumbs having a social stream displayed by social entity, social contributor and social tag. A user may select a social entity, social contributor or social tag for additional searching (see, e.g., FIG. 11). FIGS. 10-17 show various features of the GUI, as can be implemented on systems provided herein. For instance, the GUI may include a social toolbar that provides various search functionalities. The social toolbar (see FIGS. 10 and 17) can be embedded in a web site, such as, for example, the web site of a social entity (e.g., Yale University) or social contributor. The social toolbar can permit a user to search by various search terms, such as social entities, social contributors, social tags, or combinations thereof. A search performed in a social toolbar can display a search window with the results of the search, which can include a navigation panel and a social search stream (see FIG. 5).

A system having an embedded social toolbar can communicate with a system for serving social media content, such as the system 200 of FIG. 2, to provide search results to a user. The system for serving social media content can provide search capabilities to the system having the embedded social toolbar for a fee, such as a license fee.

While graphical user interfaces have been described with reference to various figures, it will be appreciated that such descriptions are illustrative and non-limiting. Graphical user interfaces with other features and configurations can be used with systems and methods provided herein.

For instance, a GUI can include a social breadcrumb panel at the top of the screen and a social stream panel below the social breadcrumb panel. As another example, a GUI can include a social toolbar having an input field for a search string and a drop-down menu listing social entities, social contributors and/or social tags. A social stream can be displayed below the social toolbar.

In some situations, the results of a search are provided to a user after a user inputs a search string and instructs the system to conduct a search. In other situations, the system provides inline searching, in which case the results of a search are provided to the user as the user inputs a search string.

Some embodiments provide graphical user interfaces that enable users to serve social media content of industries (e.g., education) and social entities (e.g., Yale University). The GUIs can display a social stream having search results, and provide a view (also "breadcrumb view" herein) of the search results categorized by social entity, social contributor and social tag.

The GUI can enable a user to add a social entity, social contributor, and/or social tag, as may be revealed in a search, to a profile page at a social media provider (e.g., Facebook). This enables the user to navigate social media content, such as by searching and viewing a social stream, and social entities, social contributors, and/or social tags of interest to a profile page of the user.

Relational Dimensionality

This disclosure provides systems and methods that can enable relational, multi-dimensional media content searching and graphical representation of the media content. Upon display to a user, the relationship (e.g., multi-dimensional relationship) among or between media content can be displayed to the user.

Figure 24:
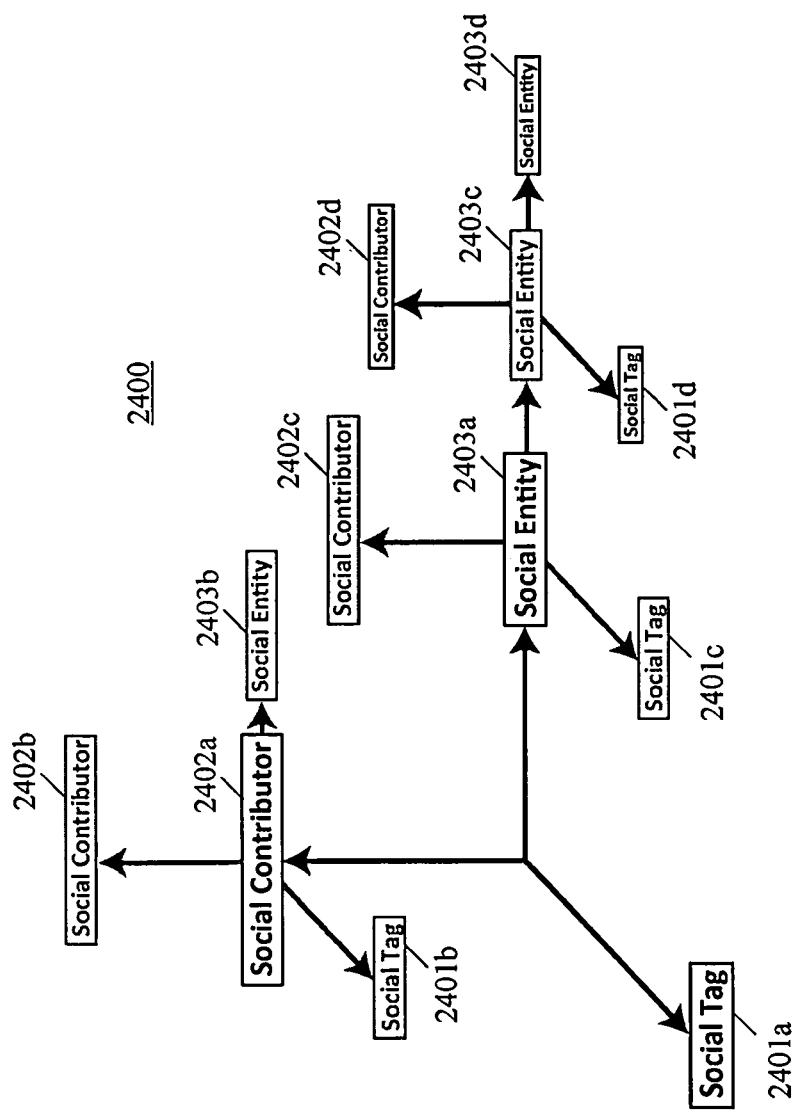
FIG. 24 shows a relational dependence of dimensions.

FIG. 24 shows an example of the relational dependence among dimensions. It will be appreciated that FIG. 24 is illustrative and non-limiting. The dimensionality can be implemented with the aid of systems provided herein, such as the system 205 of FIG. 2. The dimensions can be used to categorize media content results revealed upon a search. The dimensions can be used to store media content in memory. The dimensions can be used to describe relationships between media content. The dimensions can be used for dimensional and relational searching. In some embodiments, the dimensions can be social dimensions, as illustrated in FIG. 24. The social dimensions can include a social contributor (also referred to as "person" or "people" herein), social entity (also referred to as "entity", such as a group, organization or company herein) and social tag (also referred as "word" herein). More generally, dimensions can include entities, contributors and tags. In some embodiments, the entities, contributors and tags can have alternative names. In some cases, the dimensions can represent different or alternative relational dimensions than entities, contributors and tags. It is understood that any reference to a dimension or social dimension herein can be applied to any alternative relational categorization.

In the example shown in FIG. 24, media content revealed upon a keyword search is grouped in a first dimension or Social Contributor dimension 2402$a$, a second dimension or Social Entity dimension 2403$a$, and a third dimension or Social Tag dimension 2401$a$. In some embodiments, media content associated with the third dimension 2401$a$ can be obtained by processing media content associated with the first and second dimensions 2402$a$, 2403$a$, For example, the third dimension can be derived by indexing the first and second dimensions. The dimensions 2402$a$, 2403$a$, 2401$a$ can also be related to each other. For example, a Social Contributor dimension can be related to a Social Entity dimension, such as when, for example, a contributor belongs to or is part of an entity.

Each of the dimensions, 2402$a$, 2403$a$, 2401$a$ can be further dimensionalized. For example, the Social Contributor dimension 2402$a$ can have first, second and third dimensions 2402$b$, 2403$b$, 2401$b$, wherein the first dimension is a Social Contributor dimension 2402$b$, the second dimension is a Social Entity dimension 2403$b$, and the third dimension is a Social Tag dimension 2401$b$. As with the dimensions 2402$a$, 2403$a$, 2401$a$, the dimensions 2402$b$, 2403$b$, 2401$b$ can be derived from each other, and can be related to each other.

In another example, the Social Entity dimension 2403$a$ can have first, second and third dimensions 2402$c$, 2403$c$, 2401$c$, wherein the first dimension is a Social Contributor dimension 2402$c$, the second dimension is a Social Entity dimension 2403$c$, and the third dimension is a Social Tag dimension 2401$c$. Going one step further (or one level down), the Social Entity dimension 2403$a$ can have first, second and third dimensions 2402$d$, 2403$d$, 2401$d$, wherein the first dimension is a Social Contributor dimension 2402$d$, the second dimension is a Social Entity dimension 2403$d$, and the third dimension is a Social Tag dimension 2401$d$. The dimensions 2402$c$, 2403$c$, 2401$c$ and 2402$d$, 2403$d$, 2401$d$ can be derived from each other, and can be related to each other.

The media content revealed upon the keyword search can have a relational, multi-dimensional tree structure 2400, wherein the media content has, at first, three dimensions, and wherein relationships exist between these dimensions. In a second dimensional branching step, one of these dimensions again has three dimensions, and again relationships exist between the dimensions. Thus, at each dimensional branching, which in some cases can be an indexing operation and/or a filtering operation, the tree structure is split into three dimensions. Each dimensionalization step can proceed in three possible directions, and the dimensionalization steps or levels can be repated n times depending on how many levels the system or user wants to drill down. Thus, the tree structure can branch into $3^n$ possible dimensions. Further, each dimensionalization step can be an indexing step and/or a search step. For example, if a user wants to drill down five levels of search, the system can perform five searches, wherein a specific (on this case first, second or third) direction is selected in each search step. A sixth dimensionalization step can be performed by the system in order to provide grouped media results to the user. The sixth dimensionalization can be an indexing step. In some examples, if the user wants to drill down 'n' levels, the system can perform 'n' searches, wherein 'n' is a number that is greater than or equal to zero. In some examples, the system can drill down at least 1, 2, 3, 4, 5, 6, 7, 8, 9, 10, 100, 1,000, 10,000, 100,000, or 1,000,000 by performing at least 1, 2, 3, 4, 5, 6, 7, 8, 9, 10, 100, 1,000, 10,000, 100,000, or 1,000,000 searches, respectively.

Each dimension can comprise a plurality of media content. The plurality of media content can be related to the original keyword or search term which revealed the media content. In some embodiments, an individual media content belonging to a dimension in an $n^{th}$ search step can, when presented to a user, be used by the user to start a new search. In this instance, the individual media content can be become a keyword or search term. The keyword or search term can reveal media content results of new first multi-dimensional search step, such as illustrated by the media content dimensions 2402a, 2403a, 2401a.

Figure 25:
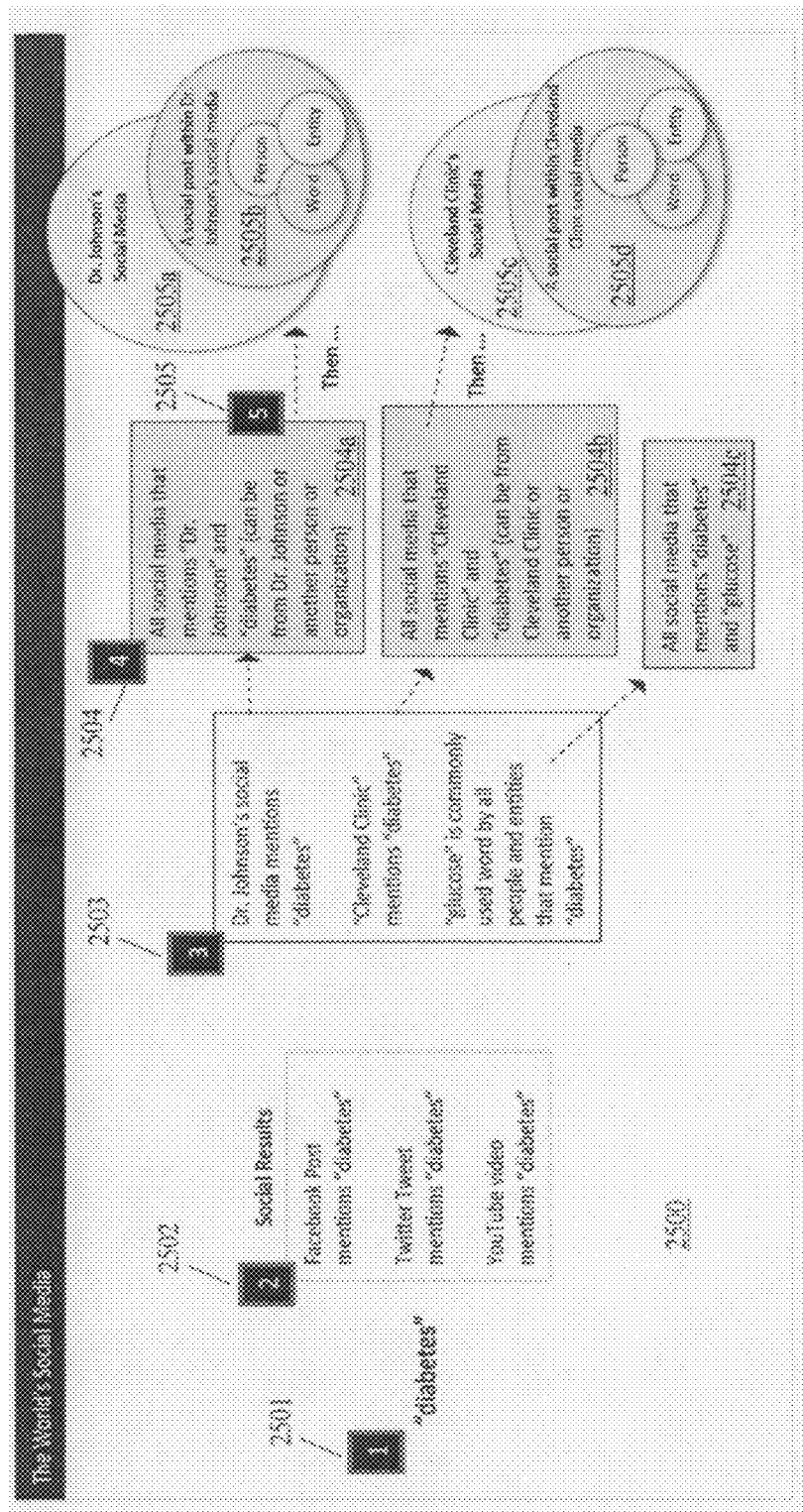
FIG. 25 shows a method for searching social media content.

FIG. 25 shows a method 2500 for searching social media content. The method social media search method is an example of a media search method in accordance with the invention. The method can be implemented with the aid of systems provided herein, such as the system 205 of FIG. 2. Search results revealed upon implementation of the method can provide relationships in accordance with the invention.

The method includes conducting a search for media content, such as social media content. The search can be implemented using a search engine, such as the social search engine described elsewhere herein.

The method can include indexing social media at various scales, such as in a company or organization; across multiple companies or organizations; in a city or across cities; in a state or across multiple states; in a country or across multiple countries; or even the World. The system for implementing the method 2500 can index all dimensions (i.e., all people, entities, words). When a user searches "diabetes" in a first step 2501, the system for implementing the method 2500 displays the results ("social media results" or "social results") for "diabetes" in a second step 2502. The social results can include, for example, a Facebook® post that mentions "diabetes", a Twitter tweet that mentioned "diabetes", a YouTube video that mentions "diabetes", and so on.

The social search engine can index all social media content available. When a user searches with a keyword "diabetes" in a first step 2501, the social search engine provides social search results ("social results") comprising relevant social media content in a step 2502. As an alternative, the social search engine can index all potential keywords or combinations of keywords. When a user searches with a keyword "diabetes" in a first step 2501, the social search engine provides social search results ("social results") comprising relevant social media content in a step 2502. The social results provided in step 2502 may or may not be indexed by dimensions.

In a third step 2503, the system for implementing the method 2500 can comb through each post, find related dimensions and index such dimensions (e.g., "Dr. Johnson" or "glucose"). For example, as shown in FIG. 25, the system determines that Dr. Johnson's social media mentions "diabetes" in his social media. In another example, the system determines that "Cleveland Clinic" mentions "diabetes" in their social media. In yet another example, the system determines that "glucose" is a commonly used word by all people and entities that mention "diabetes."

In a fourth step 2504, the user can filter social results, for example by selecting "Cleveland Clinic." The filtered results can show all social media that mentions both "diabetes" and "Cleveland Clinic," as shown in step 2504b. The social media that mentions "Cleveland Clinic" and "diabetes" can be from Cleveland Clinic or another person or organization. In another example, the user can filter social results by selecting "Dr. Johnson." The filtered results can show all social media that mentions both "diabetes" and "Dr. Johnson," as shown in step 2504a. The social media that mentions "Dr. Johnson" and "diabetes" can be from Dr. Johnson or another person or organization. In yet another example, the user can filter social results by selecting "glucose." The filtered results can show all social media that mentions both "diabetes" and "glucose," as shown in step 2504c. The social media that mentions "diabetes" and "glucose" can be from any person or organization.

In a fifth step 2505, the system for implementing the method automatically indexes ("auto indexes") dimensions within the first found dimension. For example, "Dr. Johnson" was found; then, all of his social media 2505a is searched and indexed by person, entity, or word. Each social post 2505b within Dr. Johnson's social media can be indexed by person, entity, or word. In another example, "Cleveland Clinic" was found; then, all of Cleveland Clinic's social media 2505c is searched and indexed by person, entity, or word. In some cases, each social post 2505d within Cleveland Clinic's social media can be indexed by person, entity, or word. In another example, the method automatically indexes dimensions within the social posts revealed in the social media that mentions "diabetes" and "glucose" (provided in step 2504c).

The method implemented by the system can repeat itself. The method can be repeated at least 1, 2, 3, 4, 5, 6, 7, 8, 9, 10, 100, 1,000, 10,000, 100,000, 1,000,000, or more times. The method can be repeated a substantially large number of times, in some cases by way of an iterative (or recursive) loop. The method can be implemented recursively or iteratively.

Figure 26:
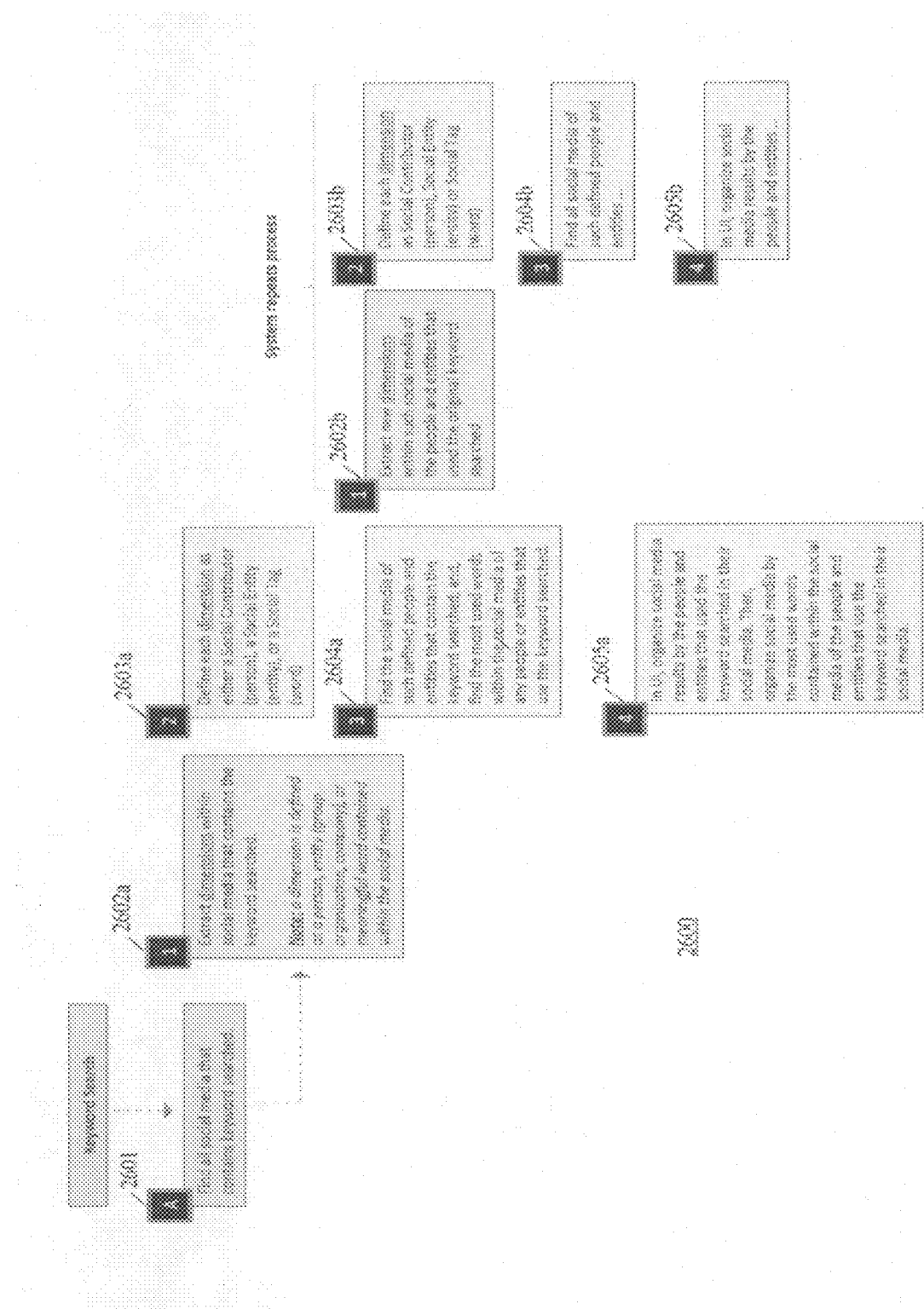
FIG. 26 shows a method for collecting multi-dimensional social media content.

FIG. 26 shows a method 2600 for collecting multi-dimensional social media content. The method can be implemented with the aid of systems provided herein, such as the system 205 of FIG. 2. The method includes extracting and defining one or more dimensions within social media (i.e., within each social post or social result). In some embodiments, the method includes defining a social score which can take into consideration each individual dimension's likes, comments and/or shares as a form of user interaction, or other factors that may be related to a dimension.

The method can include extracting dimensions and defining the dimensions as either a person, entity (group, organization, company) or word. Subsequently, the method can autogenerate new index(es) on each defined dimension.

As shown in the example in FIG. 26, a system implementing the method responds to a keyword search provided by a user by finding all social media that contains the keyword searched in a first step 2601. In a second step 2602a, the method extracts dimensions within the social media that contains the keyword searched. In this example, a dimension is defined as a person, entity (group, organization, company), or meaningful word contained within the social media. Alternative or additional dimensions may be defined in other embodiments.

In this example, in step 2603a the system defines each dimension as either a Social Contributor (e.g., person), a Social Entity (e.g., entity), or a Social Tag (e.g., word). In a following step 2604a, the method finds the social media of such defined people and entities that contain the keyword search. Further, the method finds the most used words within the social media of any people or entities that use the keyword searched.

In a next step 2605a, which can be performed at a user interface provided herein, such as a graphical user interface, the method includes organizing social media results by the people and entities that used the keyword searched in their social media. Further, the method includes organizing social media by the most used words contained within the social media of the people and entities that use the keyword searched in their social media.

In some embodiments, the steps 2601, 2602a, 2603a, 2604a and 2605a can be grouped, or broken up into partial steps. In some cases, the steps can be rearranged. It is understood that the example sequence described herein is not to be limiting. This sequence can be modified, rearranged, or otherwise altered.

With continued reference to FIG. 26, the sequence 2602a, 2603a, 2604a and 2605a can be repeated on social media collected in a next sequence of steps 2602b, 2603b, 2604b and 2605b. The step 2602b extracts new dimensions within such social media of the people and entities that used the original keyword searched. Then, in step 2603b, the method defines each dimension as Social Contributor (e.g., person), Social Entity (e.g., entity) or Social Tag (e.g., word). Next, steps 2604b and 2605b are analogous to steps 2604a and 2605a, performed within such social media of the people and entities that used the original keyword searched. The sequence of step and subsequent drill-down of collected content can be repeated any number of times.

Figure 27:
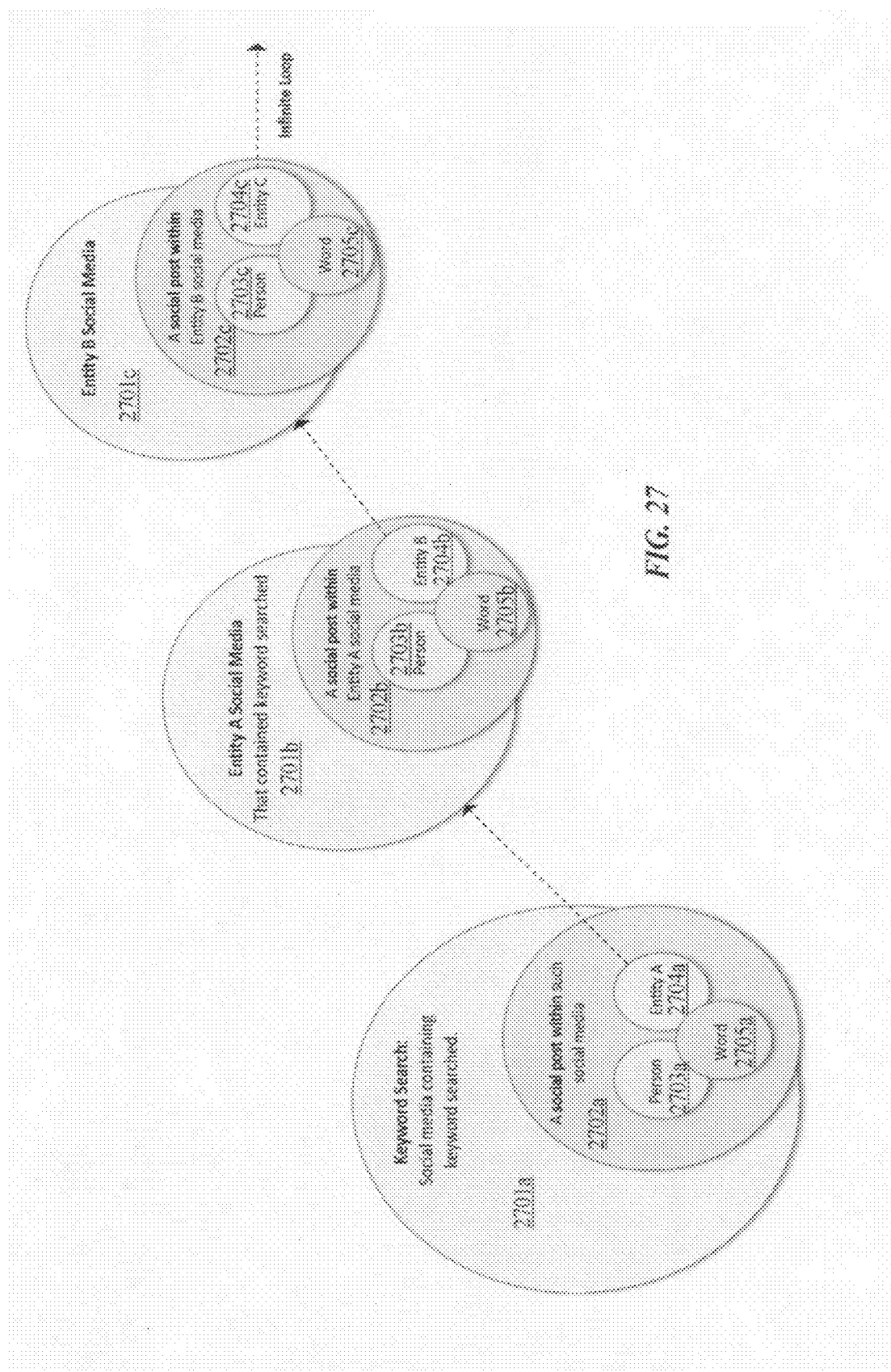
FIG. 27 is a graphical representation of a multi-dimensional social media universe.

FIG. 27 is a graphical representation of a multi-dimensional social media universe. Such a universe is representative of social media content, and is an example of a universe of any media content. As described herein, a keyword search may reveal one or more social results. The results can be social media containing the keyword searched and can be represented as a set of social media 2701a. The set 2701a can include a plurality of social media posts or content. For example, the set 2701a can contain one or more social posts or content 2702a within such social media in set 2701a. The social post 2702a can have dimensions; for example, the dimensions can be Person 2703a, Entity A 2704a and Word 2705a.

The relationally dimensional systems and methods described herein enable the defined dimensions, such as the defined Person dimension, the defined Entity A dimension or the defined Word dimension to be drilled down. In the example shown in FIG. 27, the defined Entity A has a set of social media 2701b that contained the keyword searched. For example, the set 2701b can include one or more social posts 2702a which have an Entity A dimension. A new search is performed within the defined Entity A social media that contained the keyword searched, 2701b, to find new people, entities (e.g., Entity B), and words from the Entity A social media. For example, the set 2701b can contain one or more social posts or content 2702b. The social post 2702b can have dimensions; for example, the dimensions can be Person 2703b, Entity B 2704b and Word 2705b.

As illustrated in FIG. 27, further drill-down can be performed, for example, within the defined Entity B, which has a set of social media 2701c obtained in preceding drill-down steps. A new search is performed within the defined Entity B social media obtained in earlier drill-down steps, 2701c, to find new people, entities (e.g., Entity C), and words from the Entity B social media. For example, the set 2701c can contain one or more social posts or content 2702c with dimensions Person 2703c, Entity C 2704c and Word 2705c.

The drill-downs can be repeated any number of times. Each step can include indexing of dimensions. The process can be repeated in an iterative (or recursive) loop. Thus, the drill-down search (and corresponding graphical representation described herein) utilizes a relationship between a keyword searched and the people and entities that use such keyword in their social media, and the most used words. Then, the search uses the indexing of new people and entities, and most used words, related to such people and entities, and so on.

The drill-downs are not limited to entities, but can be performed along any dimension. Furthermore, subsequent drill-downs can be performed within different dimensions (e.g., a first drill-down can be along the Entity dimension, and a second drill-down can be along the Person dimensions, and so on.)

FIG. 28 show screenshots of a GUI illustrating relational dimensionality described in FIGS. 24-28 and elsewhere herein. In this example, a user searched "San Francisco Giants," as indicated (2801) on a graphical user interface in accordance with the invention, shown in FIG. 28A. All social media containing this phrase is displayed along with the people and entities that use this phrase in their social media. In addition, the most used words within the social media of these people and entities are displayed (not shown). The displayed results are organized in a relationally and multi-dimensional manner. For example, multiple dimensions (e.g., Social Contributors or people, Social Entities or entities, etc.) are presented hierarchically to reflect their relationship to a keyword or search term (each dimension being a subset of the set of all social media having the search term "San Francisco Giants", the dimensions in this example are indented). Individual social media belonging to a set of social media corresponding to a given dimension are also hierarchically presented to reflect their relationship to the dimension (the individual results in this example are indented with respect to the dimension). Furthermore, relationships between dimensions can be visually represented as described herein. For example, "Bruce Lee" may have a relationship to "SF Weekly," which can be displayed graphically (not shown).

In FIG. 28B, the user selects "Virgin America." Now all social media containing both "San Francisco Giants" and "Virgin America" are displayed. The relationship of the social media presented to the set "San Francisco Giants" defined by a first keyword or search term, and to the dimensional subset "Virgin America" defined in a second drill-down search is displayed in a Social Search Path 2802 on the graphical user interface (San Francisco Giants/Virgin America).

The drill-down searched can enable relational filtering. Relational filtering can be performed using the graphical representation displayed in the left part of the GUI. Alternatively, the relational filtering can be performed using the Social Search Path 2802. The relational filtering and representation as shown in the GUI can be updated in a coordinated fashion.

As shown in FIG. 28C, the user can select Virgin America from the Social Search path and new search results show the people, entities, and most used words relating to "Virgin America," as indicated (2803) on the GUI. This creates a new search, based on the relationship created from the original keyword search (e.g., "San Francisco Giants" leads to relationship with Virgin America which leads to a new search of "Virgin America").

The GUIs described herein can provide a hierarchical, multi-dimensional category view to the user. The GUIs described herein can provide social search organization. In some cases, the GUIs can be described as relational operating systems, which can visualize relationships between dimensions.

With reference to FIGS. 24-28, in some examples, systems and methods of the disclosure can extract dimensions within social media of keyword searched. Then, the systems and methods can define dimensions as a person (also referred to as "Social Contributor"), entity (also referred to as "Social Entity", e.g., group, organization, company), or word (also referred to as "Social Tag").

Systems and methods of the disclosure can find social media of such defined dimensions that contain the keyword searched.

Systems provided herein can organize a user interface (UI), which may be a graphical user interface (GUI), by listing such dimensions (i.e., the people and entities whose social media contains the keyword searched and the most used words within the social media of the people and entities that use the keyword searched).

All dimensions, including new dimensions, can be automatically indexed (i.e., all dimensions contained within the social media of the dimensions of the original keyword searched). This can allow a user to conduct a new search based on the relationships created by the original search (e.g., in FIGS. 28A-C, "San Francisco Giants" leads to its relationship with Virgin America which then leads to a new search on "Virgin America"). This dimensional and relational approach can advantageously enable the search and user interface (e.g., GUI) features described herein.

The systems and methods of the invention can organize the UI of the search via the Social Search Path (e.g., San Francisco Giants/Virgin America).

EXAMPLES

Example 1

A user searches "Yale University." The social search engine provides the user all results for Yale University, including Facebook posts, Twitter tweets, Google+ posts, blog posts, YouTube videos/channels, LinkedIn posts or updates, 4Square posts and Yelp posts on a single webpage or mobile web page. The results can be indexed by social media provider (e.g., Facebook®, Twitter®, Google+®, etc.), social entity, social contributor, or social tag.

Example 2

Figure 3:
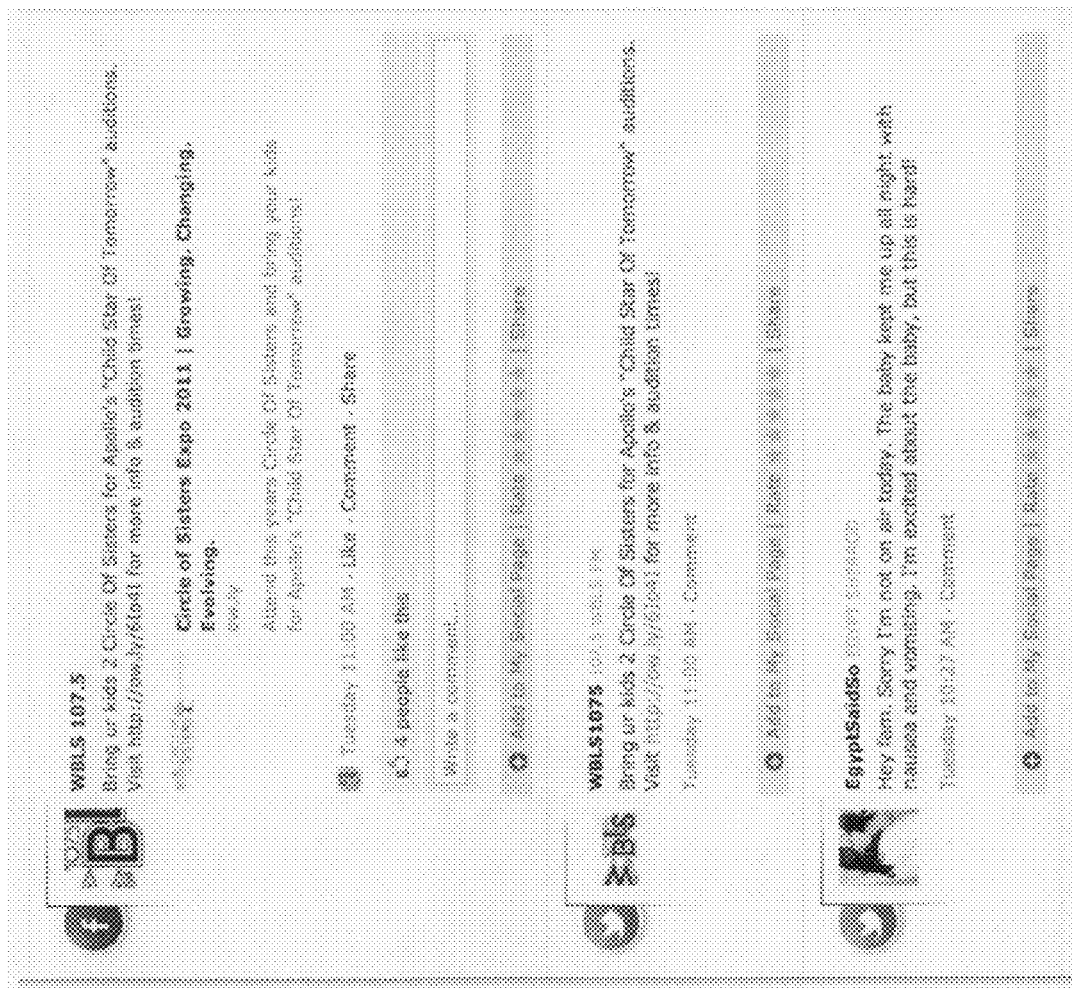
FIG. 3 shows a portion of an example social stream, in accordance with an embodiment of the invention.

A user searches "WBLS." The social search engine provides the user all results of or relating to WBLS. FIG. 3 shows a section of the social stream for WBLS, as indexed and displayed via the social search engine of a system implementing the search. The image shows a Facebook post from WBLS-FM, a Twitter tweet from WBLS-FM, and a Twitter tweet from Egypt Sherrod, one of its disc jockeys. The social search engine can group results by social provided (e.g., Facebook, Twitter, etc.).

Example 3

Figure 4:
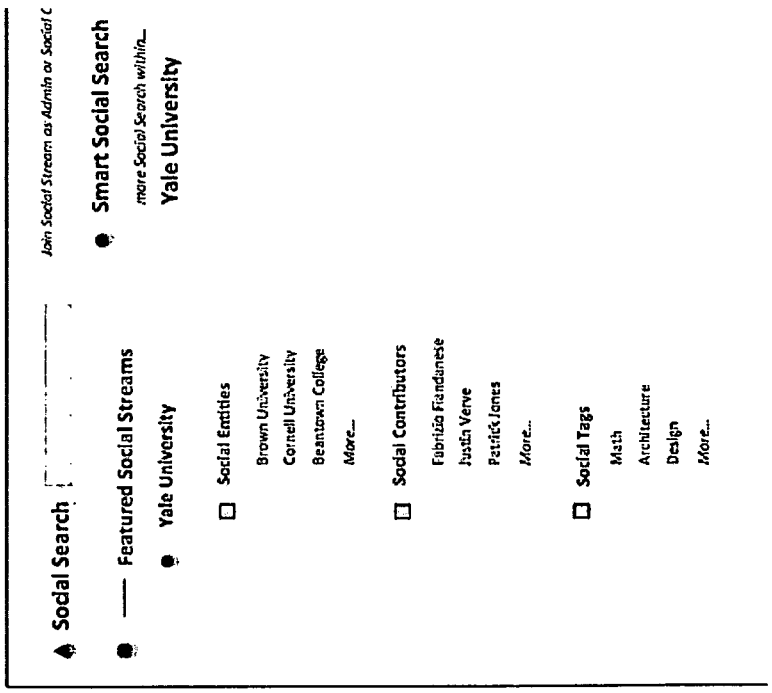
FIG. 4 shows the results of a search in which elements of a social stream are grouped by social entity, social contributor and social tags, in accordance with an embodiment of the invention.

With the aid of systems provided herein, such as the system 205 of FIG. 2, a user searches "Yale University" and results are displayed (grouped) by "Social Entities," "Social Contributors," and "Social Tags," as shown in FIG. 4. Social Entities are entities that mention Yale in its social media (e.g., Harvard University); Social Contributors are users affiliated with Yale (e.g., Professors, coaches, Guidance Counselors, etc.); Social Tags are created by the system or predetermined by one or more users to display the most used words from the social activities of Yale University (e.g., "admissions," "field hockey," "math"). The user then searches the results provided in FIG. 4 for the term "center point." The results of the search are shown in FIG. 5, which shows "center point" under Professor Smith, a social contributor, and "math," a social tag associated with Professor Smith. The search provides social media content from the illustrated path (Yale University/Professor Smith/Math) that mention center point. In the illustrated example of FIG. 5, there is no social media content from the illustrated path that mentions center point.

Example 4

Figure 6:
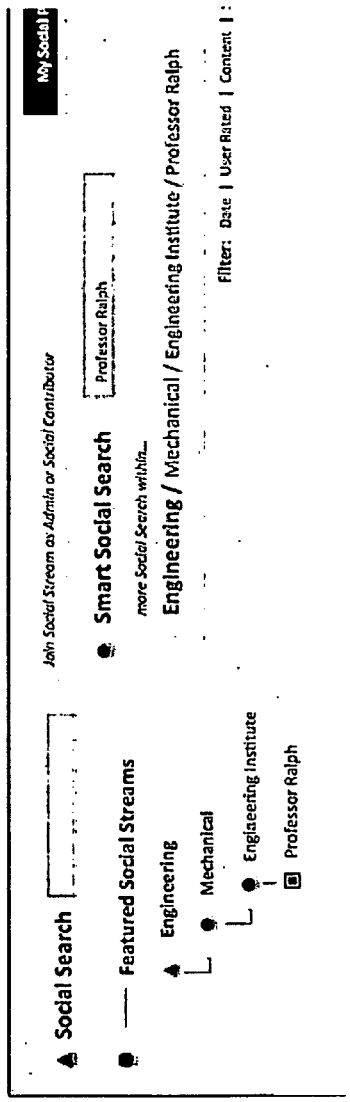
FIG. 6 shows the results of a focused smart social search of a social stream, in accordance with an embodiment of the invention.

With the aid of systems provided herein, such as the system 205 of FIG. 2, a user conducts searches directed at predetermined terms. Following the search, the system indexes the search results to facilitate user access of the results. For instance, the user searches "engineering" and is provided results for engineering. The user then searches "mechanical" within the results for "engineering." The user further searches for the "Engineering Institute" within engineering/mechanical. The user then searches for "Professor Ralph" within engineering/mechanical/Engineering Institute. The results of the search as provided by the system are shown in FIG. 6. The user can readily "branch down" or "branch up" the search tree for entities, contributors, and tags.

Example 5

Figure 7:
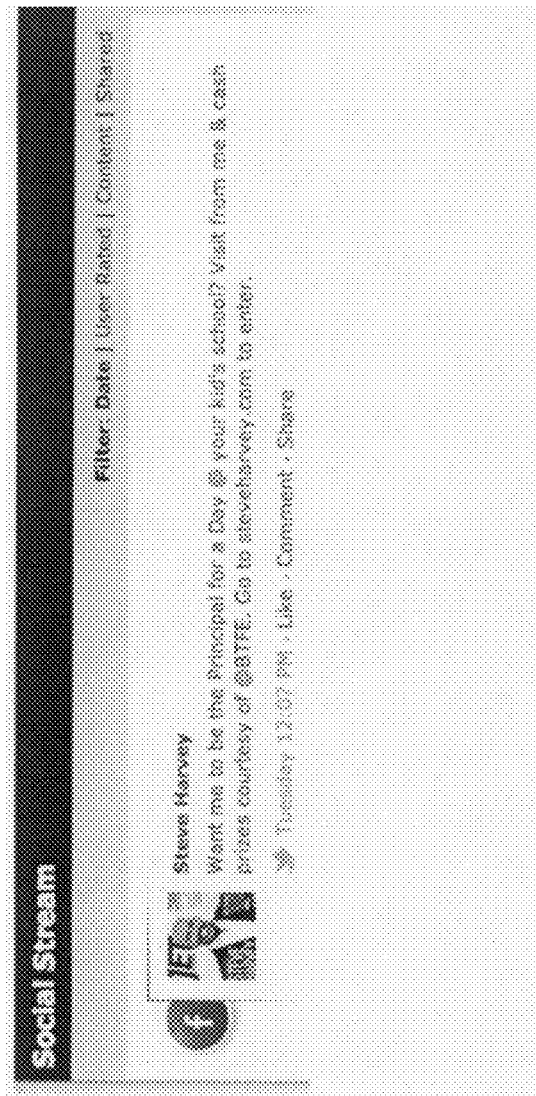
FIG. 7 shows the results of a social stream filtered by "Date," in accordance with an embodiment of the invention. The most current posts are at the top of the list.

A first user desires to view a social stream of a second user. The first user inputs the second user's name into a search field of a social search engine, which may be implemented on systems provided herein. The system displays the social stream of the second user on a graphical user interface of the system, which may be a web interface of the system. The user can sort the search results by various fields, such as date posted. FIG. 7 shows an example social stream for user "Steve Harvey" sorted by date posted.

Example 6

With the aid of systems provided herein, such as the system 205 of FIG. 2, a user can utilize a content filter within the social stream to display posts in order from those with the most content to those with the least content. Such content can include text, uniform resource locators (URL's), images, video, and rich media.

Example 7

Figure 8:
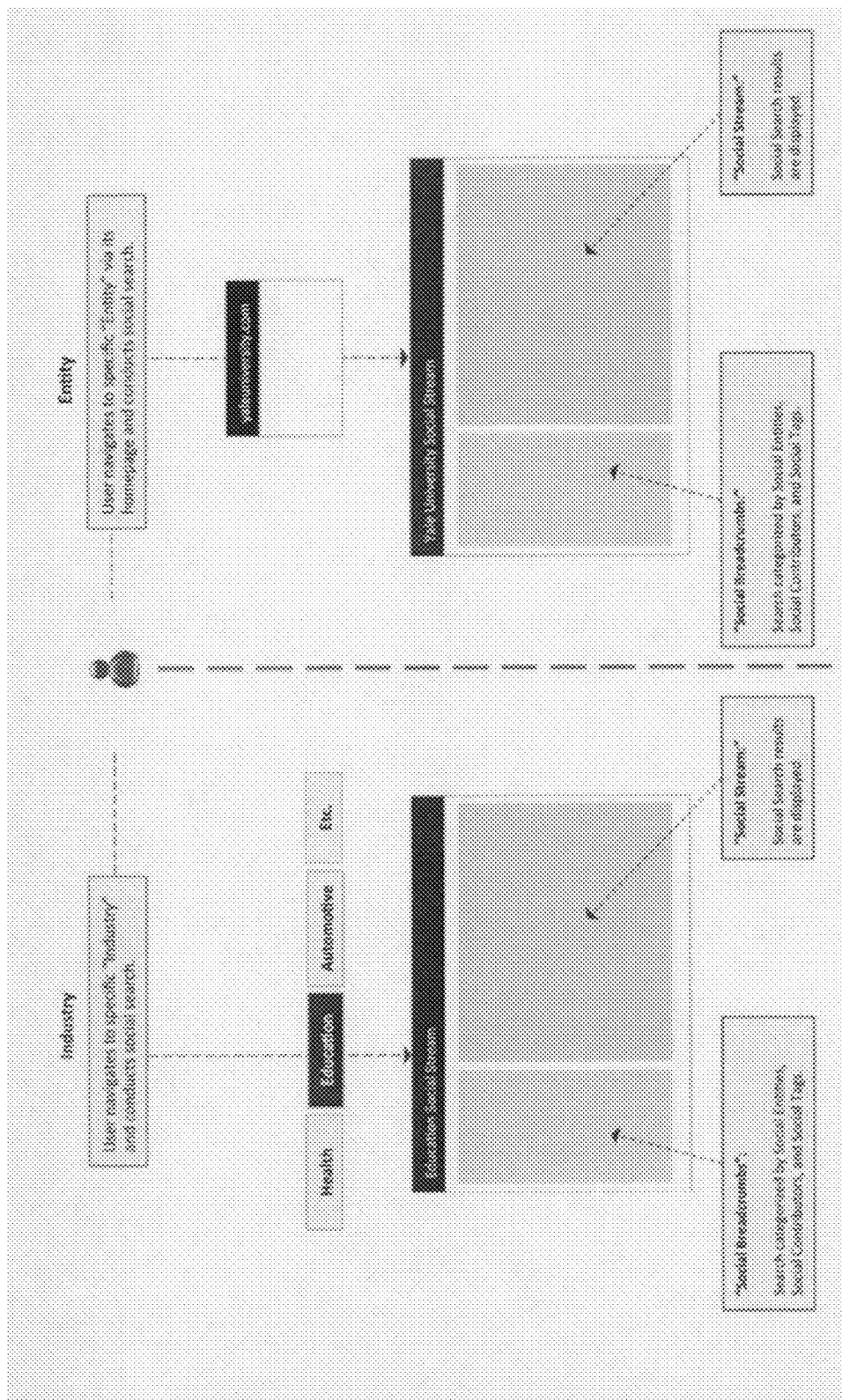
FIG. 8 shows a graphical user interface, as can be implemented with the aid of systems provided herein.

FIG. 8 shows a graphical user interface (GUI), as can be implemented on a system provided herein. The GUI provides a user navigation panel (left panel, also "social breadcrumbs" herein) and a social stream panel (right panel). The system permits a user to aggregate social media content of an industry (e.g., education) and social entity (e.g., company, institution, organization). The user navigation panel can change as the user views different content provided in the social stream.

In the illustrated example, under a search directed at industries (to the left of the vertical dotted line), the system conducts a search and enables the user to view search results by industry ("Health," "Education," "Automotive"). The user selects Education. The system then shows the user the Education social stream. Social search results are provided in the right panel. A social breadcrumb (left panel) shows the results of the search categorized by social entities, social contributors, and social tags. Alternatively, under a search directed at social entity (to the right of the vertical dotted line), the user conducts a social search of the web site "yaleuniversity.com". The system access the web site and downloads social media content. The system displays the results of the search in a two-panel graphical user interface. Under "Yale University Social Stream," the system shows (left panel) the results of the search categorized by social entity, social contributor and social tag. The right panel shows the social stream of the search, which provides social search results.

FIG. 9 shows a navigation panel of an education social stream. In the illustrated example, the user views the education social stream, which shows results categorized by social entity, social contributor and social tag. The system permits the user to search within a provided social stream. In the illustrated example, the user searches "Yale University" within the "Education" industry social stream. The system provides search results categorized by social entity, social contributor and social tag. The user permits the user to add a social entity ("Yale University" in the illustrated example) to the user's social page.

Example 8

Figure 10:
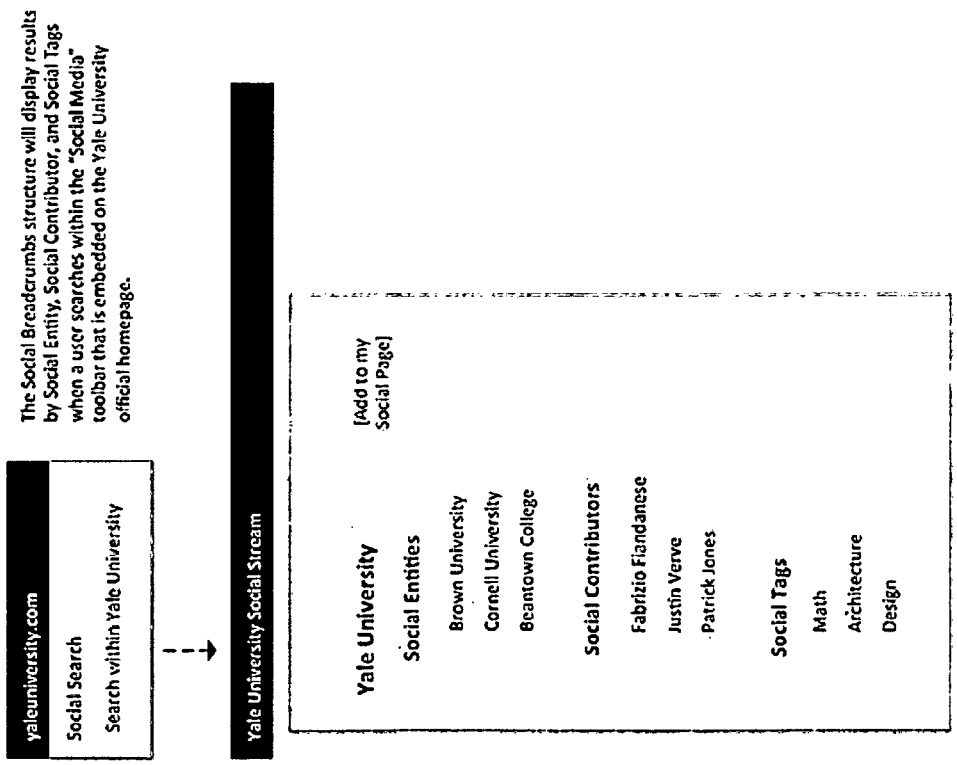
FIG. 10 shows a social toolbar (top) and a social stream for Yale University (bottom) that is provided upon a search using the social toolbar.

FIG. 10 shows a social search toolbar (top), as can be embedded in a web page of a social entity or social contributor. A social search using the toolbar generates a social stream directed at the terms of the search. In the illustrated example, the social search toolbar is embedded in the Yale University homepage. A user is able to input search terms in a text field of the toolbar. From the search terms, the system generates a social stream. The social stream, as illustrated, has a social breadcrumb structure that displays results categorized by social entity, social contributor and social tag.

Example 9

Figure 11:
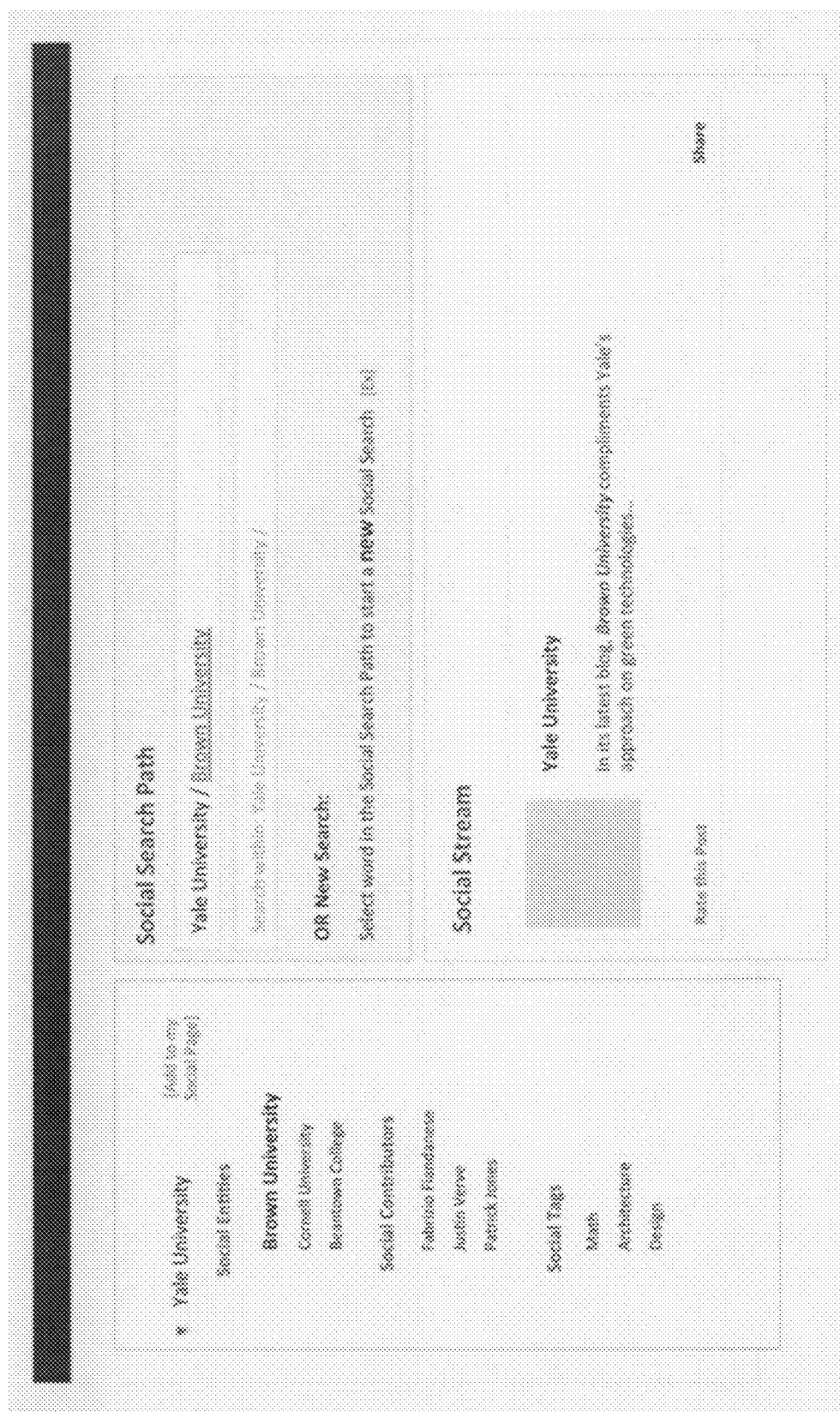
FIG. 11 is a screenshot of a graphical user interface (GUI) showing a social breadcrumb, social search path and social stream.

FIG. 11 is a screenshot of a graphical user interface (GUI) showing a social breadcrumb (left panel), social search path (right-top) and social stream (right-bottom). The GUI can be implemented by any system provided herein. In this example, a user selects "Brown University" within the social breadcrumb (as a social entity of "Yale University"), and the system provides a social stream showing social media content from Yale University that mention Brown University. The social breadcrumb view enables the user to hierarchically view the user's path and present view (i.e., Yale University→Social Entities→Brown University). The social search path window (or panel) enables the user to view the user's path. In the illustrated example, the user's path is "Yale University/ Brown University." Within the social stream window (right-bottom), the GUI provides the user a link to "Share" the social stream having social media content from Yale University that mention Brown University. In some cases, the social stream can be shared on a profile page of the user, such as a profile page hosted by a social media provider (e.g., Facebook®).

Figure 12:
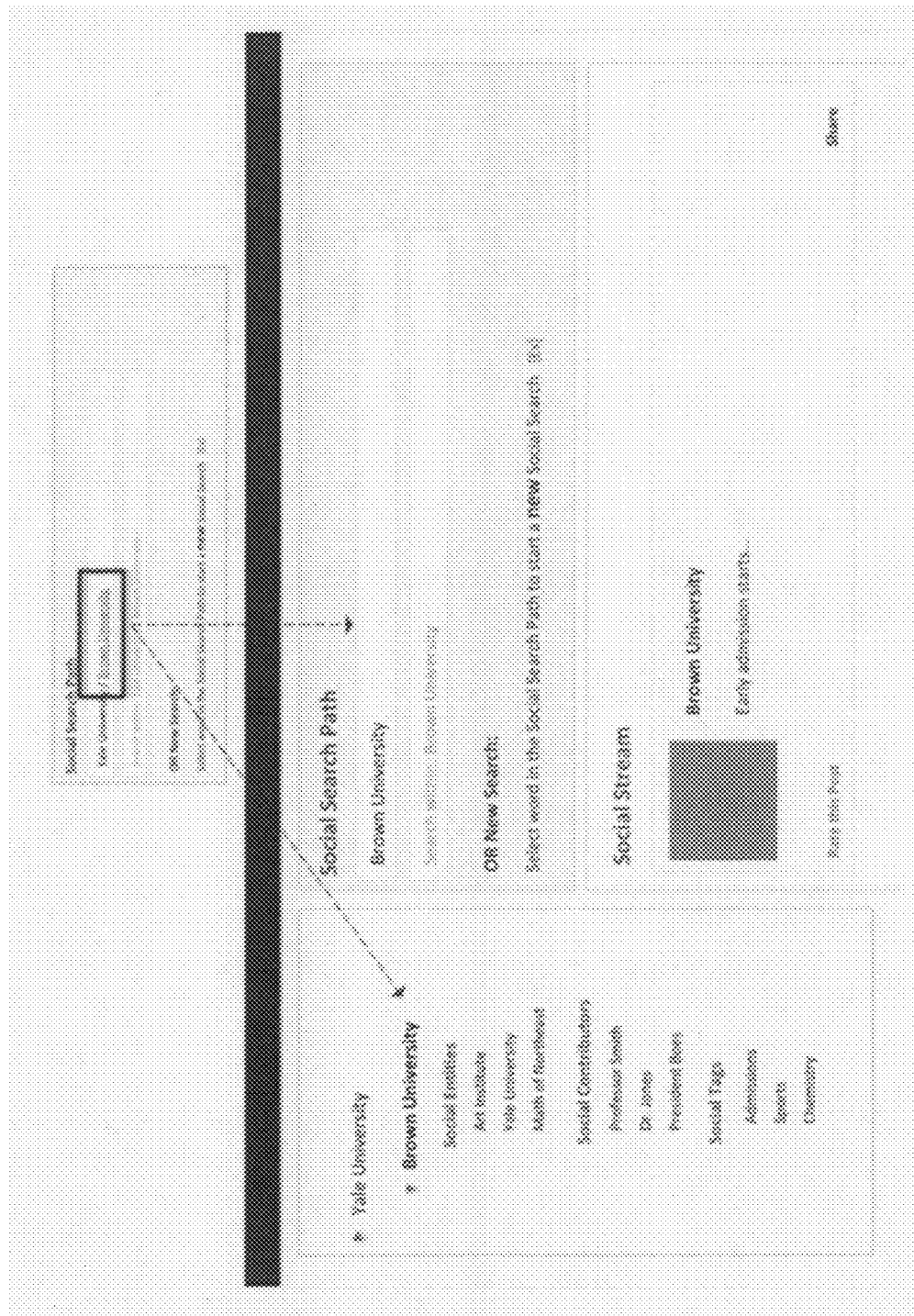
FIG. 12 is a screenshot of a GUI in which a user has selected "Brown University" with the social search path of FIG. 11.

In FIG. 12 the user selects (e.g., clicks on with the aid of a pointing device) "Brown University" within the social search path of FIG. 11, which triggers a new social search directed to "Brown University." The social breadcrumbs display (bottom image, left panel) displays social entities, social contributors and social tags below "Yale University." This may permit a user to hierarchically determine the path ("Yale University/ Brown University") the user has taken to reach the displayed search results.

Figure 13:
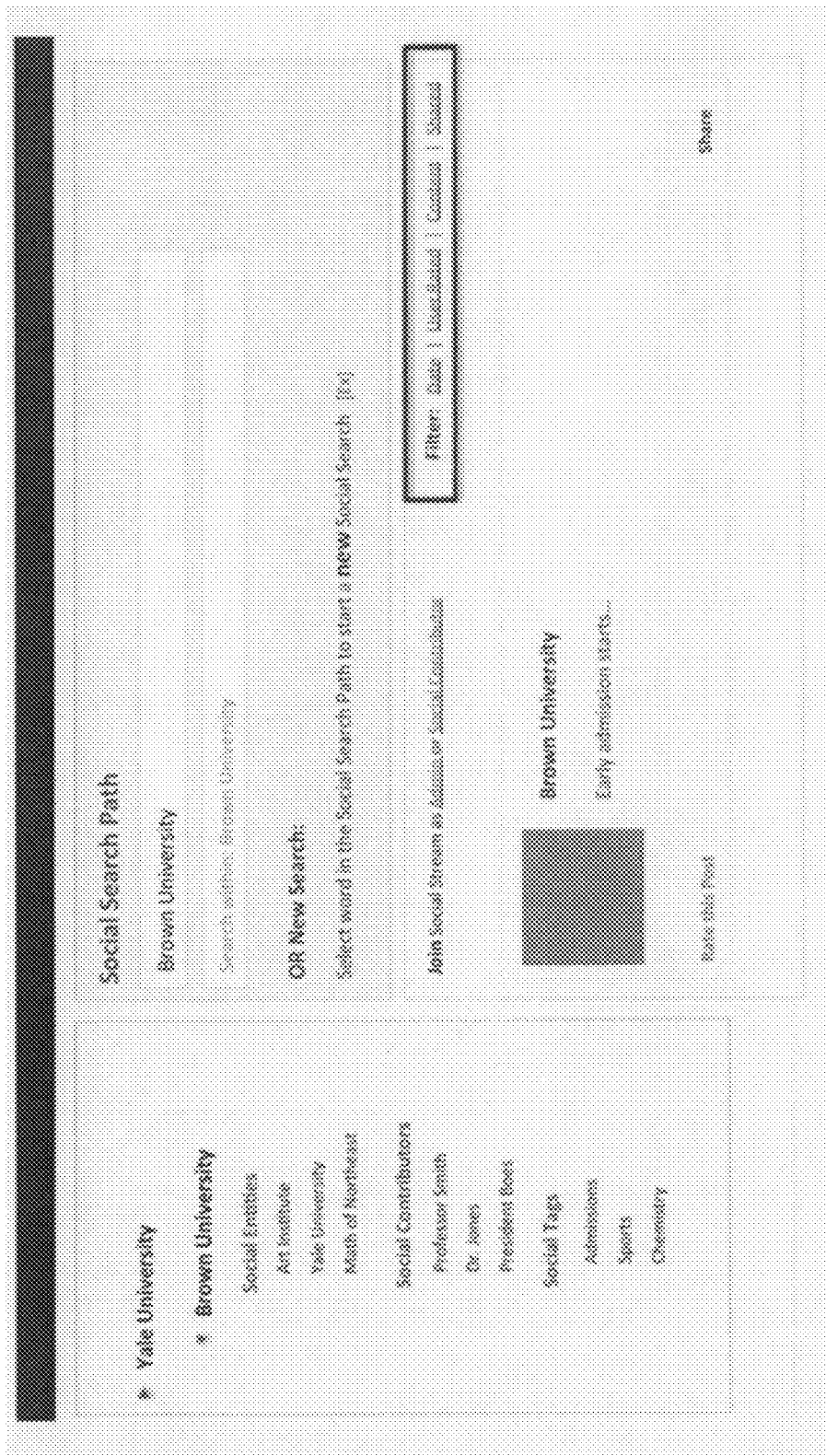
FIG. 13 is a screenshot of a GUI in which a user has filtered social media search results by Date, User Rated, Content, or Shared.

With reference to FIG. 13, within a social stream the user can filter social media search results by date, user rating ("User Rated"), content and/or sharing ("Shared"), as indicated by the boxed links. The user can select "Date" to filter the social stream by date, or select "User Rated" to filter the social stream by user rating—e.g., social media content with the highest user rating is at the top, and content is provided in the order of decreasing user rating. As another option, the user can select "Content" to filter and display social media results by the most content (e.g., text, audio/video, images, URL's) within an individual social media. As yet another option, the user can select "Shared" to filter and display social media results by the most shared social media content amongst select users, such as users of a particular social media provider, users across a plurality of social media providers, or users of the system implementing the displayed GUI.

Example 10

Figure 14:
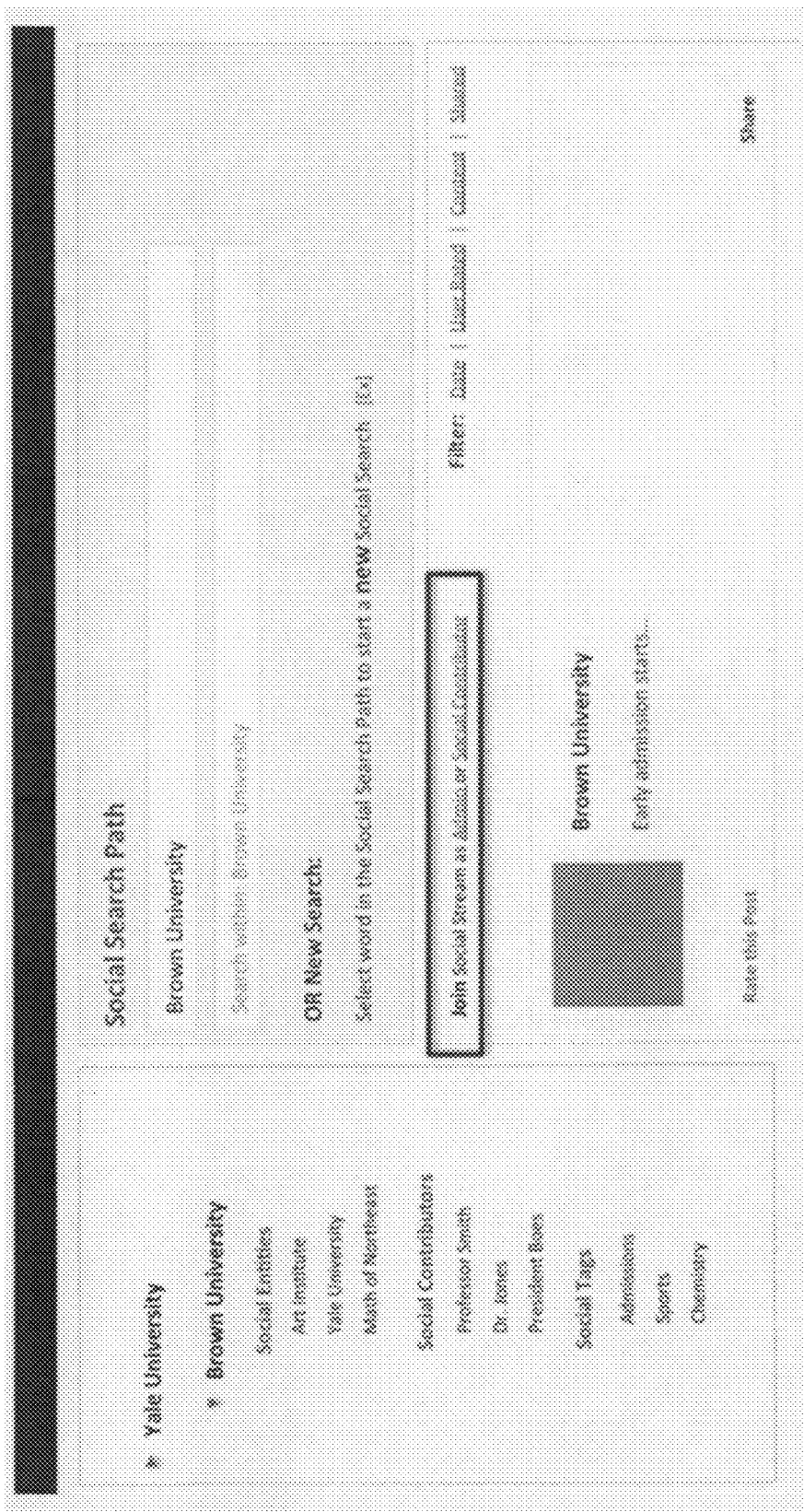
FIG. 14 is a screenshot of a GUI with a field permitting a user to join as an administrator ("Admin") or a social contributor.

Systems provided herein can provide various administrative capabilities. Within a social stream, an administrator ("Admin") can add or remove social contributors. FIG. 14 is a screenshot of a graphical user interface (GUI) with a field (box) permitting the user to join as an Admin or social contributor. Various features may be accessible to the user based on the user's login (i.e., Admin or social contributor). For example, as an Admin, Brown University can add the Dean of Economics social media (e.g., blog posts, Facebook®, Twitter®, Google+®, Yelp®, Fousquare®, LinkedIn®, Instagram®) to its social stream. This may help any current or potential student of Brown University to better understand the full scope of Brown University and, specifically, its Economics department under the Dean of Economics. Brown University can also add social tags, such as words that help promote Brown University. For example, if admissions is an important element to Brown University, then Brown University can create a social tag and social media content that helps educate and promote admissions to Brown University.

Example 11

Figure 15:
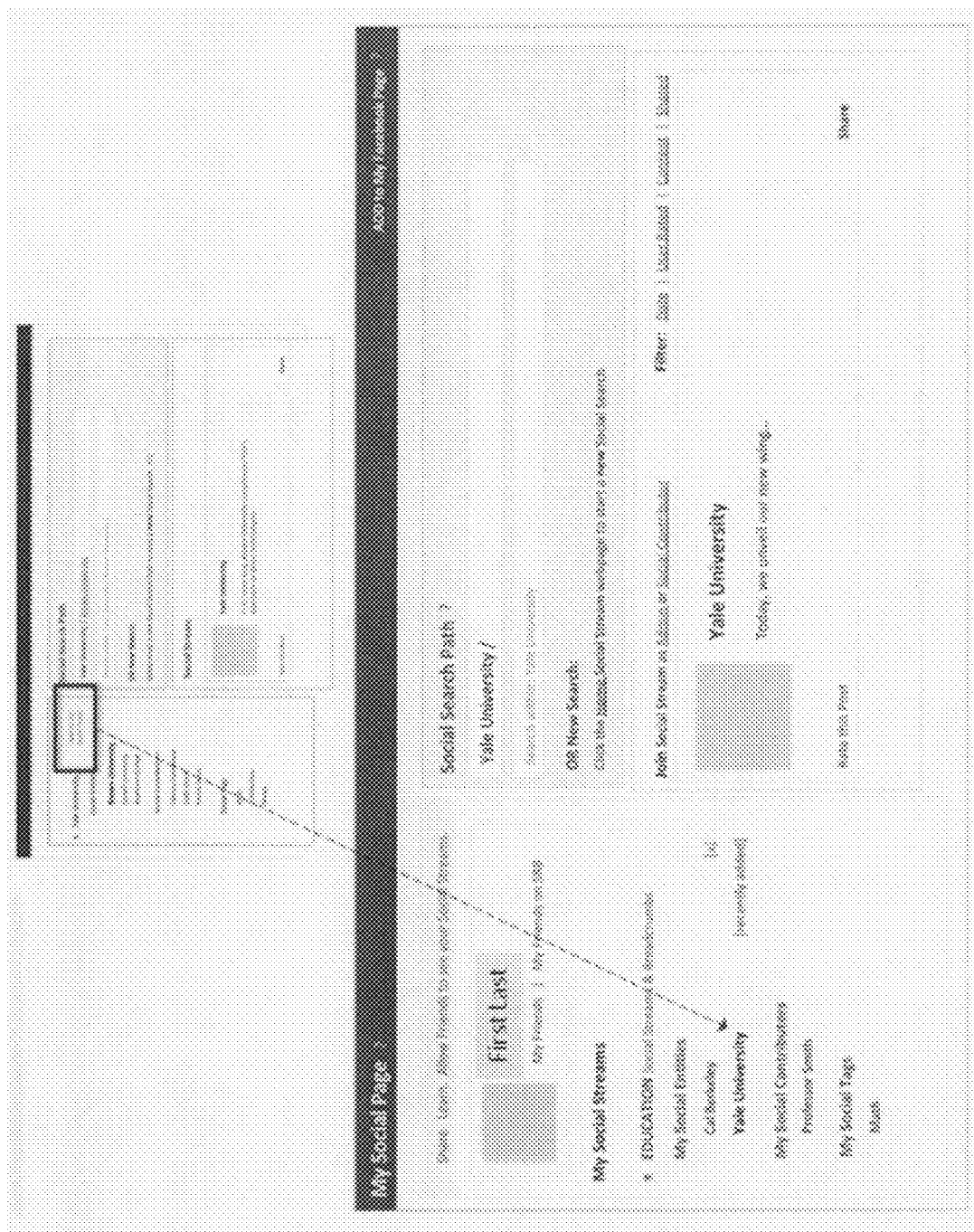
FIG. 15 shows screenshots of a social search (top screenshot) and a user's social page (bottom screenshot)

A user can add a social stream to the user's social page, which can include a link to permit the user to add one or more social streams to a profile page of the user hosted by a social media provider (e.g., Facebook®, Google+®, Yelp®, LinkedIn®). FIG. 15 includes screenshots showing (top screenshot) a social search having a social breadcrumb panel (left panel), social search path (right-top panel) and social stream (right-bottom panel). The social breadcrumb panel includes a link ("[Add to my Social Page]") to permit the user to add the social stream to the user's social page (bottom screenshot). By selecting the link, the system adds the social stream for "Yale University" to the user's social page ("My Social Page"). The social page (bottom) includes a link (top-right) to permit the user to add various social streams to the user's Facebook page ("ADD to My Facebook Page").

Example 12

Figure 16:
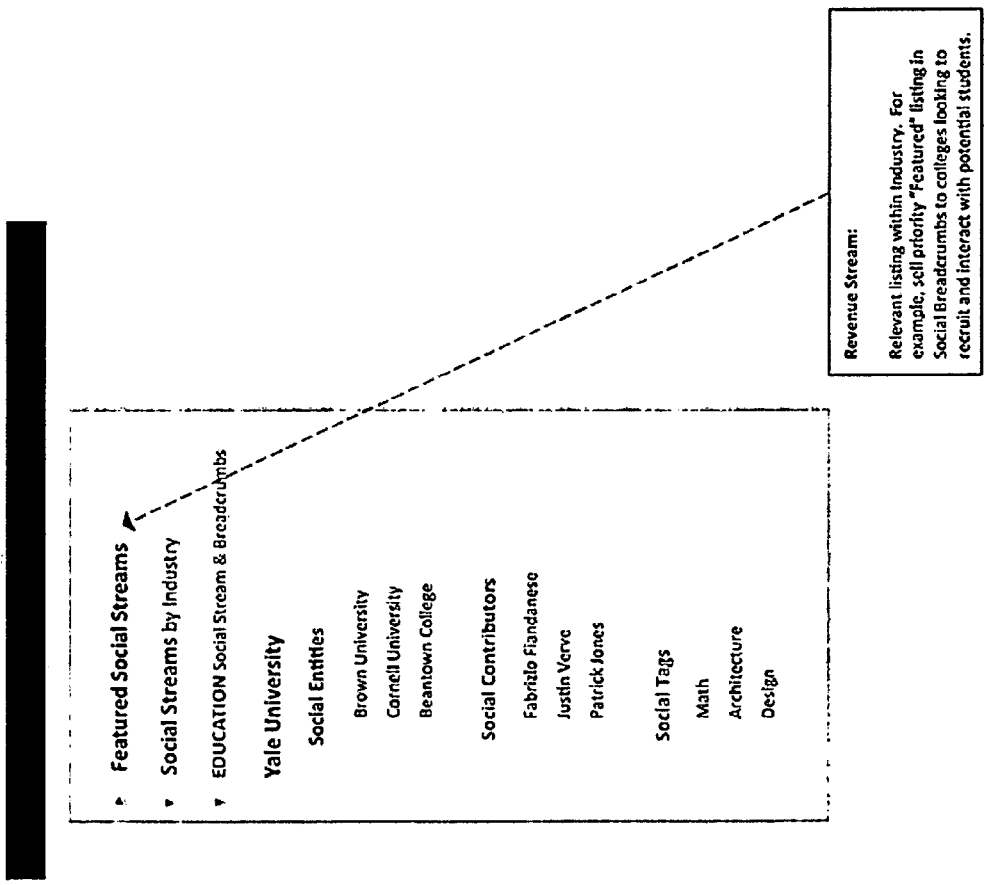
FIG. 16 is a screenshot of a GUI showing a social search.

FIG. 16 is a screenshot of a graphical user interface (GUI) showing a social search with a navigation panel (left) that enables a user to display search results by various categories, such as featured social streams, social streams by industry and education. The featured social streams enable the system to display social streams that are featured at a particular point in time. A featured social stream can have a higher priority in relation to other social streams and may be listed at the top of a listing of social streams. A social entity or social contributor can purchase a priority featured listing. For example, Yale University can pay a social search aggregator that implements the social search to attain priority features listing, in which case Yale University would appear under the "Featured Social Streams" link when selected by a user.

Example 13

Figure 17:
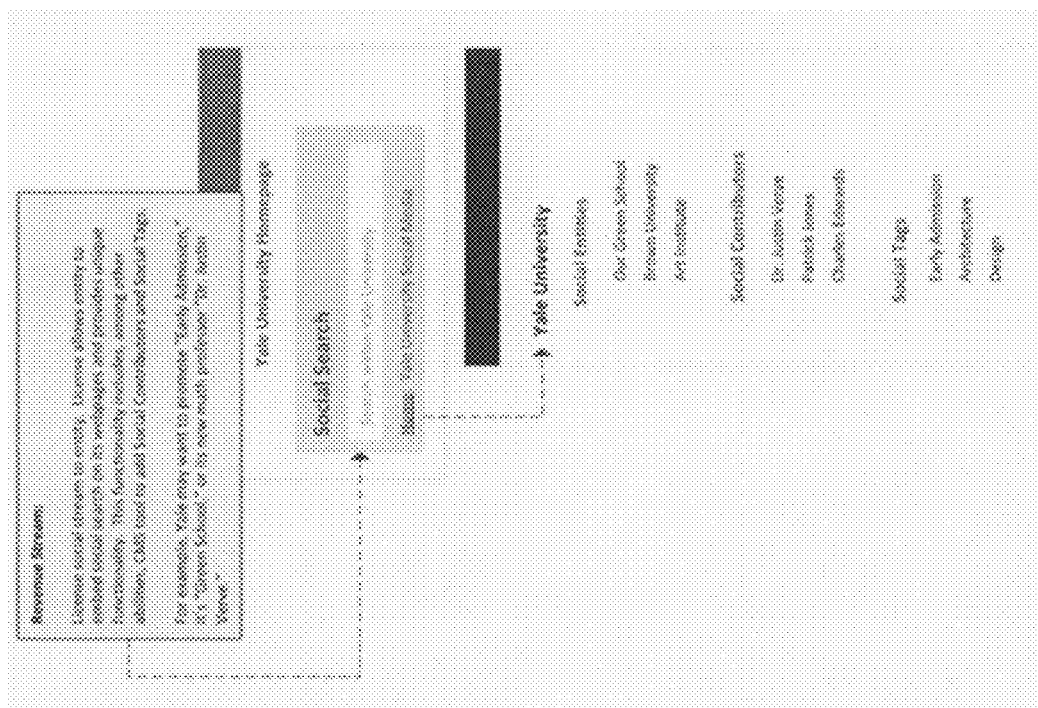
FIG. 17 is a screenshot of a social stream that has been licensed to a social entity.

FIG. 17 is a screenshot showing a social stream that has been licensed to a social entity. The license allows the social entity to embed the social search on a web site of the social entity, and provides the social entity select functionalities, such as, among other things, tools to add social contributors and social tags. For example, the illustrated social search has been embedded in Yale University's web site. Yale University can use the license to promote "Early Admission," its "Green School," or its math professor "Dr. Justin Verve."

Example 14

Figure 19:
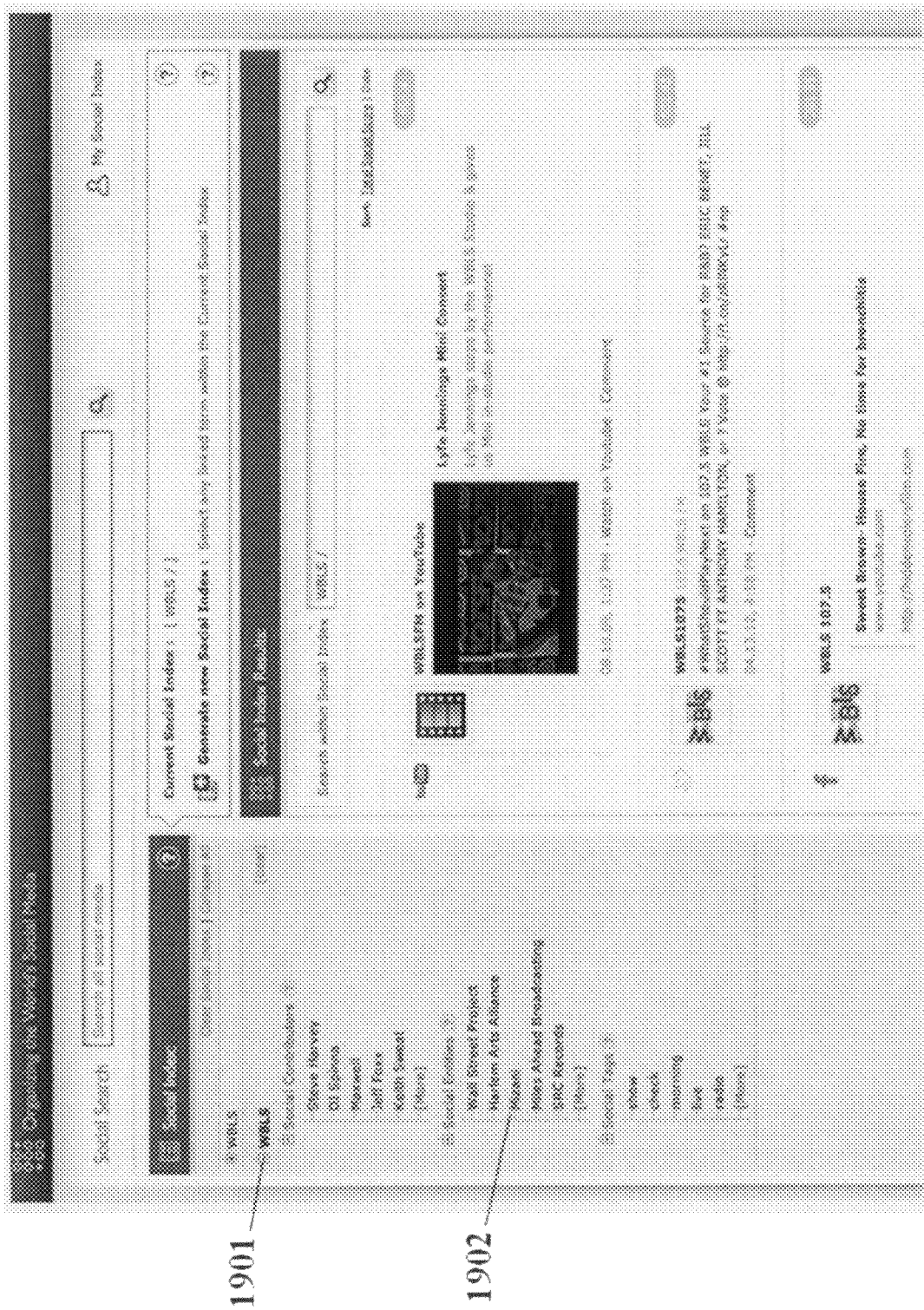
FIGS. 19-23 show screenshots of an example GUI showing various search results.

FIG. 19 is a screenshot of a GUI showing the results of a search directed to the term "WBLS" input by a user into a search field of the GUI. The GUI shows a left panel, top panel and bottom-right panel. The left panel includes search results categorized by social contributor, social entity and social tag. The top panel shows the social index of the current search. The bottom-right panel shows social index search results.

The search is conducted by a system having a database of aggregated social media content, such as the computer system 205 of FIG. 2. The results of the search directed to WBLS 1901 are displayed in the left panel and categorized by social contributor, social entity and social tag. Under Social Contributors, the results include "Steve Harvey," "DJ Spinna," "Maxwell," "Jeff Foxx" and "Keith Sweat." WBLS in the illustrated example may be an index (i.e., WBLS index), and the left panel shows social contributors, social entities and social tags that the system has identified in the search. For instance, under Social Entities the results include "Wall Street Project," "Harlem Arts Alliance," "Mizani," "Miles Ahead Broadcasting" and "SRC Records." Under Social Tags, the results include "show," "check," "morning," "live" and "radio." The system ranks and displays a diversity of social results in the panel at the bottom-right. The social results are ranked and sorted by social score, as described elsewhere herein. Individual social results are shown in sub-panels in the bottom-right panel. A top social result ("WBLSFM on YouTube") has a social score of 955.4, a middle social result ("WBLS 1075") has a social result of 951.43, and a bottom social result ("WBLS 107.5") has a social score of 201.55. The social scores are displayed on the GUI, but in some cases the social scores may be hidden from view.

Figure 20:
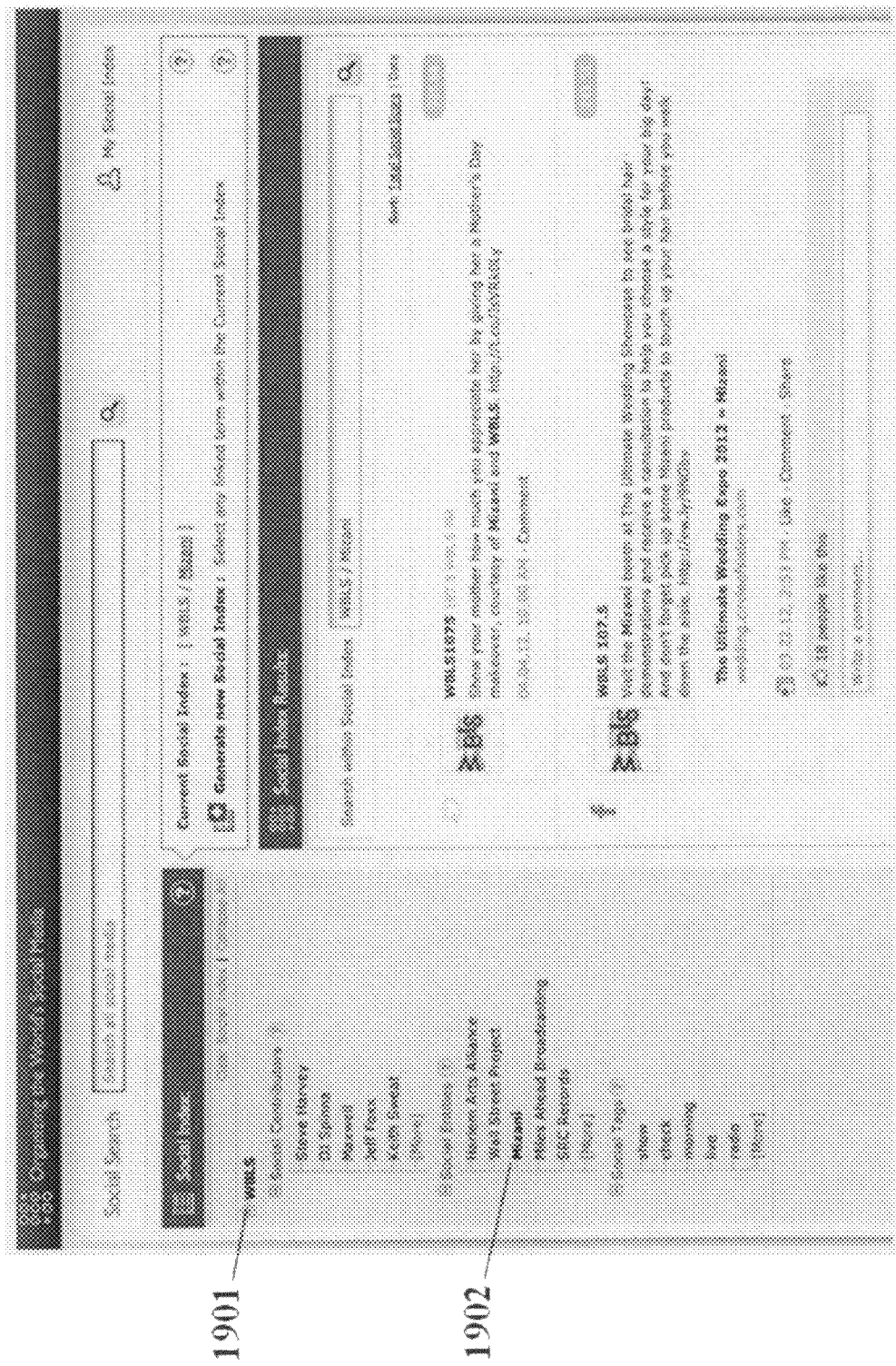

The top panel shows that the "Current Social Index" is WBLS. The user may select a social entity, social contributor or social tag from the left panel, and the system can conduct a search around the selected social entity, social contributor or social tag using the selection as a new search index. For example, the user can select Mizani 1902 from WBLS 1901. FIG. 20 shows the results of a search in which the user has selected "Mizani" from the left panel of FIG. 19, and the system has conducted a new search around the term "Mizani" by using this term as a new social index. The results of the search, categorized in the left panel by social contributor, social entity and social tag, and displayed in the right panel by social score, include social media content that is directed to the social index WBLS/Mizani. The results may include WBLS social media content from the search of FIG. 19 that mentions or otherwise includes the term "Mizani."

The search of FIG. 20 may show the social relationship between WBLS and Mizani. The bottom-right panel shows all social media from WBLS that contains Mizani and all social media from Mizani that contains WBLS. The results may be ranked or prioritized by social score. The left panel shows the results of the search categorized by social entity, social contributor and social tag.

Figure 21:
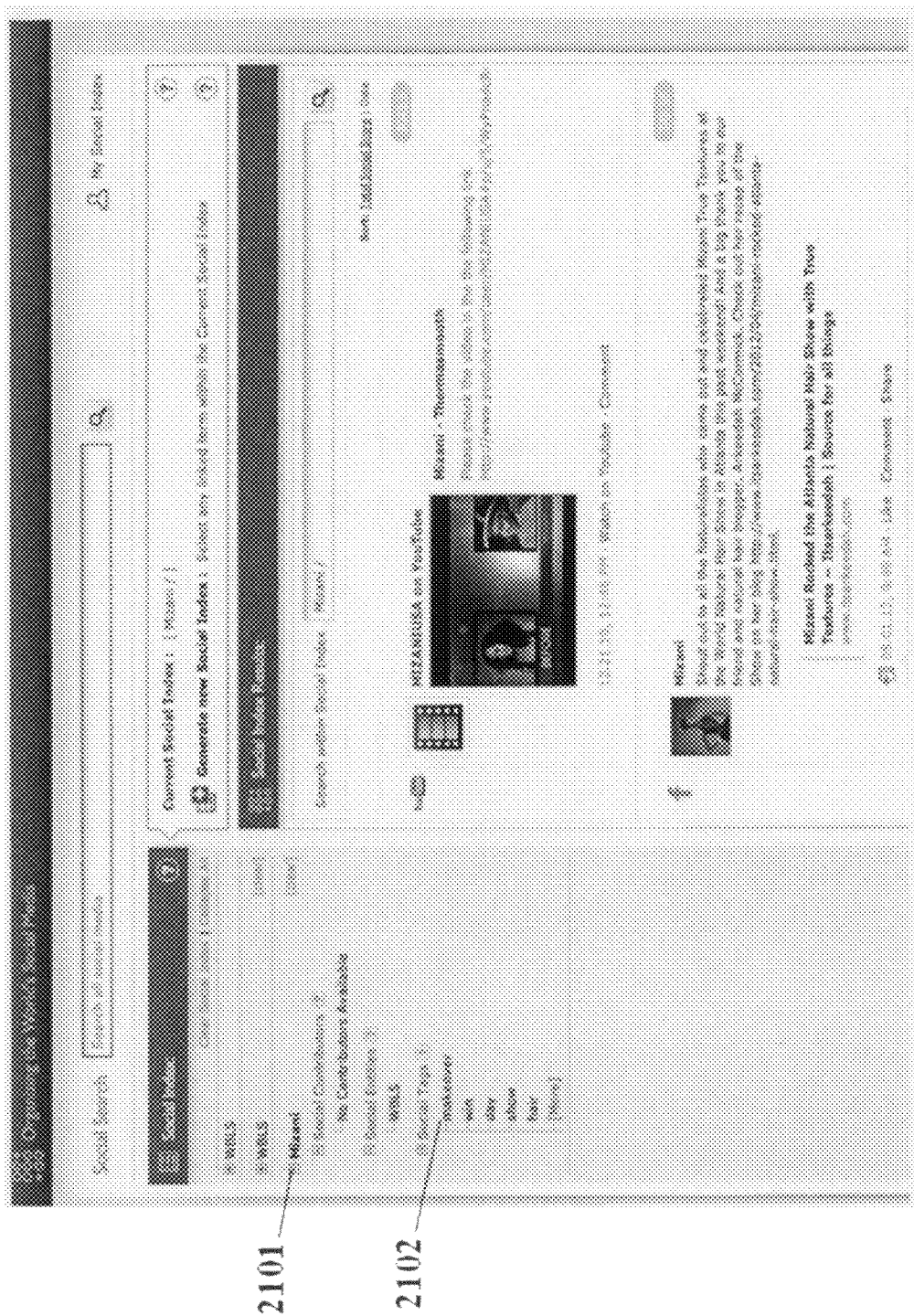

The user may create a new social search (and index) on a selected social entity, social contributor or social tag. For instance, in FIG. 20 the user can generate a new social index from the term "Mizani," which produces the search results of FIG. 21. The results of FIG. 21, as generated by the system, show a social search (and index) on Mizani. All of the social contributors, social entities and social tags for Mizani are shown in the left panel, listed under a Mizani index 2101. The bottom-right panel shows social results with social score at the right of each sub-panel. The left panel of FIG. 21 shows a Mizani index 2101 that includes social contributors, social entities ("WBLS") and social tags ("makeover," "win," "day," "show," "hair") revealed in the search directed to Mizani as the social index. The list shows a makeover 2102 social tag, which the system has identified from the search results directed at the Mizani index 2101.

Figure 22:
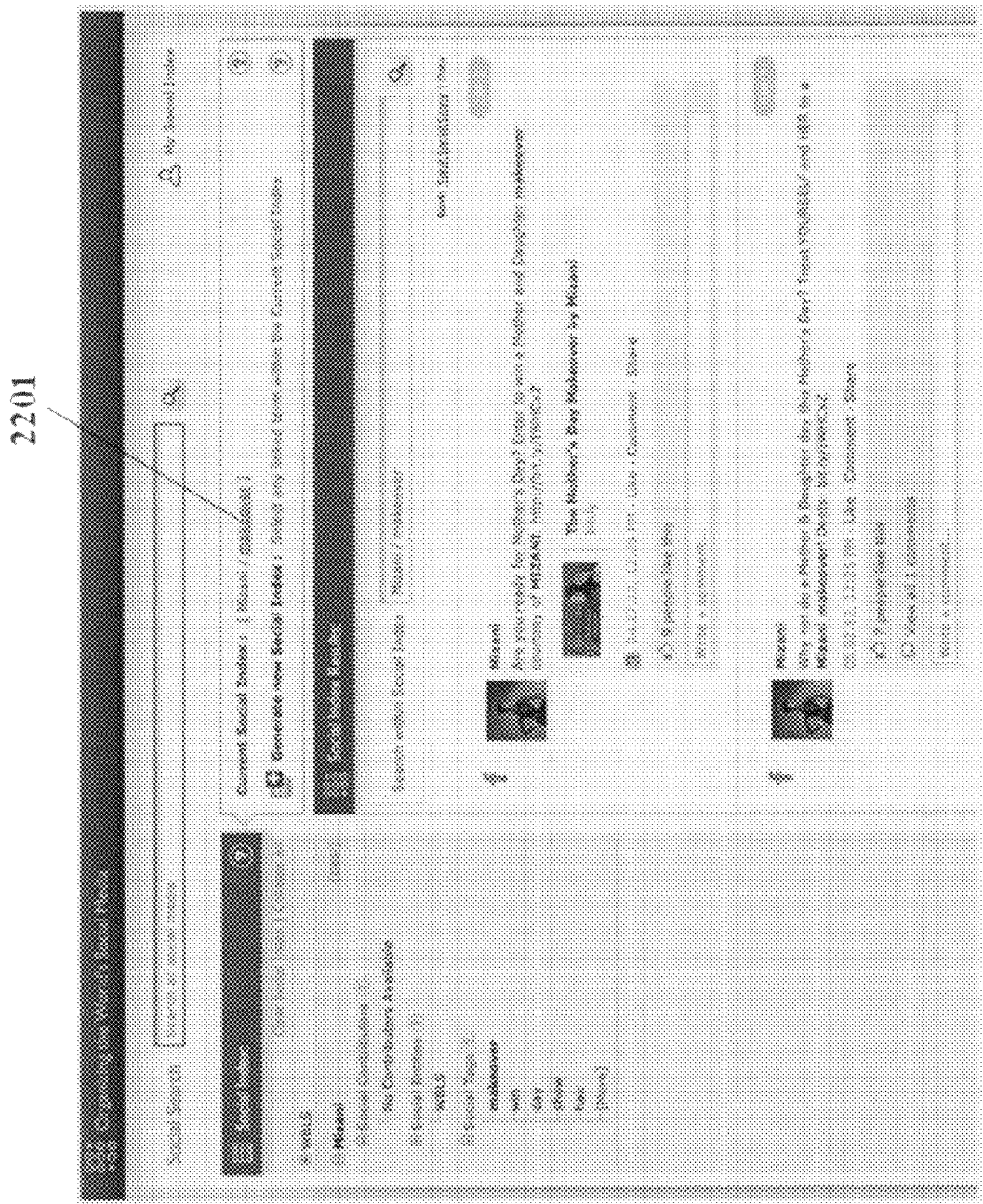

With reference to FIG. 22, the user selects the makeover 2102 social tag from the left panel of FIG. 21. The system displays on the GUI social media from Mizani that contains the term "makeover." Social results are displayed in the bottom-right panel. The social results may be sorted by social score. The makeover index 2201 has been indicated in the top panel of FIG. 22. The top panel shows the current social index ("Mizani/makeover"), which shows the path the user navigated in arriving at the instant search results—i.e., the user first conducted a search directed to Mizani and subsequently searched for all Mizani social media content that mentions makeover. In such a case, the results show all social media from Mizani having, or associated with, the tag "makeover." Subsequently, a user can select the tag "makeover" and the system will then display the most relevant Social Contributors (people), Social Entities, and Social Tags for "makeover."

In some examples, a user conducts a new search by selecting "makeover." The user can continually generate new searches by selecting a social tag, social contributor or social entity. The new searches are conducted based on the relationships between the social contributors, social entities and social tags. Additionally, the system permits a user to filter the results of a current search to review results directed to a given social entity, social contributor or social tag. In such a case, the system may not conduct a new search, but may provide a subset of current search results.

Figure 23:
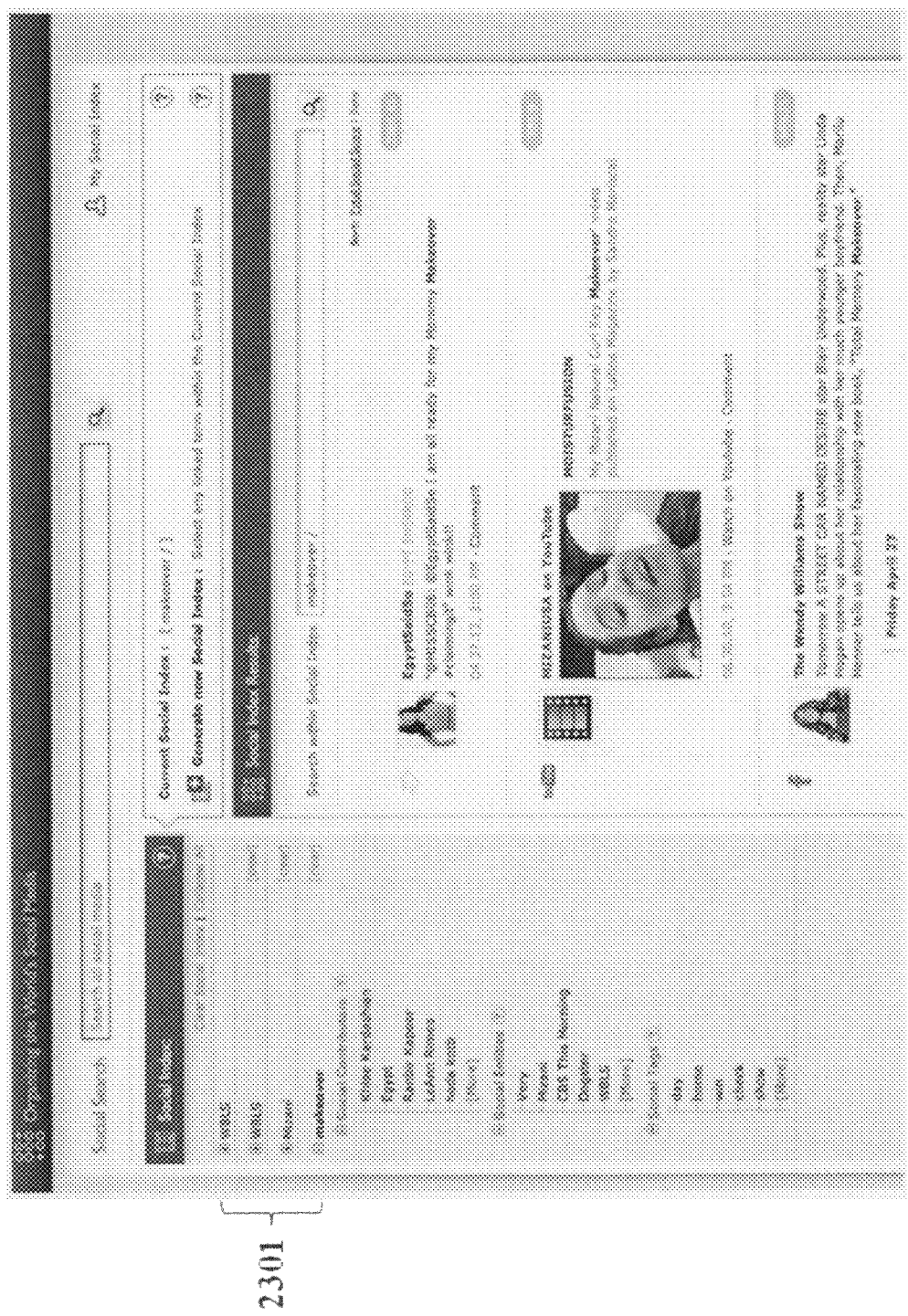

With reference to FIG. 23, the user selects the makeover index 2201 from the current social index in the top panel of FIG. 22, and the system conducts a search of social media content directed to the term "makeover." The system displays all of the social contributors ("Khloe Kardashian," "Egypt," "Ranbir Kapoor," etc.), social entities ("Very," "Mizani," "CBS This Morning," etc.) and social tags ("day," "home," "win," etc.) for the term "makeover" in the panel at the left, as shown in FIG. 23. Social results sorted by social score are displayed in the bottom-right panel.

The system can provide the user a history of search results. With reference to FIG. 23, the results of searches 2301 directed to various indexes are provided in the left panel. The results are sorted by time (i.e., most recent searches are provided at the bottom of the list, and least recent searches are provided at the top of the list). In the illustrated example, indexes for the searches directed at WBLS (two searches), Mizani and makeover are shown. The user may select an index to review the results of the search, including social contributors, social entities and social tags as a drop-down in the left panel, and the social results of the search in the bottom-right panel.

Although the GUI of FIGS. 19-23 has a particular arrangement of panels, other arrangements may be used. For instance, the left panel may be located at the right or at the top of the GUI. In some cases, the user may configure the configuration of panels as desired, such as by dragging panels into a select orientation.

Example 15

A user performs keyword search on "baseball." The system then returns a list of the people, entities, and words that are most used in the social media that contains the keyword "baseball." In an example, "Fenway Park" is one of the entities listed. The user selects "Fenway Park" and the results then display all social media that mentions "baseball" and "Fenway Park." The user then decides to conduct a new social search on "Fenway Park." The results then display a list of people, entities, and words that are most used in social media that contains the term "Fenway Park." In an example, "David Ortiz" is listed as a social contributor. The cycle may continue and provide the user a continually evolving relationship between social contributors (e.g., people), entities, and the words they use in their social media. In this example, the social index displays "baseball" (the original search) and "Fenway Park," which allows the user to view the navigational path taken by the user to arrive at all keyword searches in a given session.

Example 16

A law firm (Acme Law) wants to become an Admin within the system. Doing so allows Acme to control the people, entities, and words a user is able to view when the user conducts a keyword search on "Acme Law." Acme adds Joe Smith (the IP attorney) and Suzie Jones (the tax attorney) as Social Contributors. A user searches Acme and is presented with search results that include the social contributors Joe Smith and Suzie Jones. The user selects Joe Smith or Suzie Jones to see all of the social media from Joe Smith or Suzie Jones, respectively, that contains the word "Acme" and "Acme Law." Such an approach can enable both Joe Smith and Suzie Jones to create social media in any social media provider (e.g., Facebook®, Twitter®, YouTube®, Google+®, etc.) with the specific messages they want to deliver to current and prospective clients. For instance, Joe Smith has a recent blog post on Intellectual Property (IP) law and Suzie Jones has a Facebook® post on new Internal Revenue Service (IRS) changes. The user, interested in the latest IRS changes, can filter the social results by selecting Suzie Jones from the social results.

Example 17

A social entity (e.g., group, organization, or company) wants to view the social contributors (e.g., people), social entities and/or social tags (e.g., words) most commonly (or often) used in social media that contains such social entity. For example, ACME Corporation may want to know what social contributors (e.g., people), other social entities and/or social tags (e.g., words) are most commonly used in all of the social media content that contains the term "Acme" or "Acme Corporation." This can enable the social entity to view social contributors, social entities and/or social tags that most mention Acme and/or Acme Corporation. The social entity can also view the social contributors, social entities and/or social tags that most often mention Acme and/or Acme Corporation. Such a result may show relationships between the terms "Acme" and "Acme Corporation" and various social contributors, social entities and social tags that would otherwise not be readily apparent.

Example 18

A user wants to see the social contributors (e.g., people), social entities and social tags (e.g., words) most commonly used and the social media that mentions such social contributors, social entities and social tags. For example, Dr. Smith performs a search on himself and realizes that Johns Hopkins Hospital has mentioned him in its social media and the words most used (within the social media that contains Dr. Smith) is "fruit diet" and "fasting."

Methods and systems of the disclosure have been described, in some cases, in the context of social media. However, methods and systems of the disclosure are not limited to social media and can be applied to, or implemented in, other contexts, such as network searches.

Systems and methods provided herein may be combined with or modified by other systems and methods, such as systems and methods provided in U.S. Patent Publication No. 2011/0078584 to Winterstein et al. ("SYSTEM FOR ORGANISING SOCIAL MEDIA CONTENT TO SUPPORT ANALYSIS, WORKFLOW AND AUTOMATION") ("Winterstein"), which is entirely incorporated herein by reference. For instance, the machine learning engine and machine learning algorithm of Winterstein may be employed for use with systems provided herein, such as the computer system 205 of FIG. 2.

It should be understood from the foregoing that, while particular implementations have been illustrated and described, various modifications may be made thereto and are contemplated herein. It is also not intended that the invention be limited by the specific examples provided within the specification. While the invention has been described with reference to the aforementioned specification, the descriptions and illustrations of embodiments of the invention herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents.

What is claimed is:

1. A computer-implemented method for displaying multi-dimensional social media content, comprising:

collecting social media content from a plurality of remote social media providers and storing said social media content in a memory location;

identifying, with the aid of a computer processor operatively coupled to said memory location, social entities, social contributors and social tags in said collected social media content, wherein said social contributors have posted said social media content on said plurality of remote social media providers, wherein each of said social entities is a subject of an individual social media content, and wherein said social entities are different from said social contributors for said social media content posted on said plurality of remote social media providers;

establishing, with the aid of a computer processor, relationships between said identified social entities, social contributors and social tags, which relationships are established based upon social tags present in social media content of social entities and social contributors;

calculating a social engagement score and a social post score, and calculating from said calculated social engagement score and social post score a social score associated with each media content of said collected and organized social media content, wherein said social engagement score is based on a social relevance of said social contributors and social entities and is determined by the number of friends, fans, followers, or other measurement that assesses a social network presence of said social contributors and social entities, wherein said social post score is based on a degree of interaction of a social contributor or a social entity among said social contributors and social entities with social posts at one or more remote social media providers, wherein said degree of interaction is determined as a net of positive and any negative interactions by said social contributor or social entity with respect to said social posts on said one or more remote social media providers;

organizing, with the aid of a computer processor, said social media content in a memory location based upon said established relationships between the social entities, social contributors and social tags, to generate organized social media content in memory that permits searching of said multi-dimensional social media content, and sorting said social media content by said social score;

generating a social stream from at least a portion said collected and organized social media content, wherein said social stream includes social media activities of a social entity or social contributor that can be searched, grouped and filtered by a user; and displaying, on a graphical user interface (GUI) including a first panel, a second panel and a third panel: said social stream comprising a first subset and a second subset of the organized social media content to said user in said first panel in sequence upon a search of the multi-dimensional social media content by said user; a hierarchical relationship between said first subset and said subset in said second panel, wherein the second subset is different from the first subset; and a social search path associated with said social stream in said third panel, wherein said social search path includes a search or navigation path taken by said user in arriving at said social stream comprising said first subset and said second subset of the organized social media content, thereby enabling said user to readily identify any previous social streams;

thereby presenting said social media content to said user hierarchically across multiple dimensions to reflect their relationship to a search criterion.

2. The computer-implemented method of claim 1, wherein said identifying further comprises categorizing said social media content by social entity, social contributor and social tag.

3. The computer-implemented method of claim 1, further comprising displaying said social media content to said user on the basis of social entity, social contributor and/or social tag.

4. The computer-implemented method of claim 1, wherein said social search path is searchable.

5. The computer-implemented method of claim 1, wherein said social search path displays relationships between social entities, social contributors and social tags to allow a user to perform searching of multi-dimensional social media content.

6. The computer-implemented method of claim 1, further comprising performing a search of said social stream.

7. The computer-implemented method of claim 6, further comprising generating results from said search and grouping the results by social entity, social contributor and social tag.

8. The computer-implemented method of claim 1, further comprising grouping at least a portion of the social stream by social entity, social contributor and social tag.

9. The computer-implemented method of claim 1, further comprising displaying the first subset and the second subset of the organized social media content in a hierarchical structure.

10. The computer-implemented method of claim 1, further comprising displaying the second subset of the organized social media upon searching the first subset of the organized social media.

11. The computer-implemented method of claim 10, further comprising displaying the second subset of the organized social media upon receiving from the user a selection of a social entity, social contributor or social tag displayed in the first subset.

12. The computer-implemented method of claim 1, further comprising storing said relationships in memory as indexes to permit a search of said social media content based upon said relationships by said user.

13. The computer-implemented method of claim 1, wherein said hierarchical relationship and said first subset and second subset of the organized social media content are simultaneously displayed in said first panel and said second panel, respectively.

14. The computer-implemented method of claim 1, wherein said social media content is collected from said plurality of remote social media providers in real time.

15. The computer-implemented method of claim 1, wherein said positive and negative interactions are each weighted.

16. A computer-implemented method for searching for multidimensional social media content, comprising:

receiving, from a user, a request for a search of social media content, wherein said search is directed to a search term selected by said user, wherein said search term comprises one or more of a social contributor, social entity and social tag;

conducting, with the aid of a computer processor operatively coupled to a database of social media content, a search of social media content in said database, wherein said search of social media content is directed to said search term, wherein said social media content in said database is collected from a plurality of social media providers, wherein said social media content is organized in said database based upon relationships between social entities, social contributors and social tags identified in said social media content, wherein said social contributors have posted said social media content on said plurality of social media providers, wherein each of said social entities is a subject of an individual social media content, wherein said social entities are not social contributors for said collected social media content, and wherein said relationships are based upon social tags present in social media content of social entities and social contributors;

sorting one or more results of said search by a social score that is calculated from a social engagement score and a social post score, wherein said social engagement score is based on a social relevance of said social contributors and social entities and is determined by the number of friends, fans, followers, or other measurement that assesses a social network presence of said social contributors and social entities, wherein said social post score is based on a degree of interaction of a social contributor or a social entity among said social contributors and social entities with social posts at one or more remote social media providers, wherein said degree of interaction is determined as a net of positive and any negative interactions by said social contributor or social entity with respect to said social posts on said one or more remote social media providers;

grouping, with the aid of a computer processor, at least a portion of said one or more results of said search by social contributor, social entity and social tag to provide a first subset and a second subset of results, wherein the second subset has a hierarchical relationship to the first subset;

generating a social stream from at least a portion of said one or more results of said search, wherein said social stream includes social media activities of a social entity or social contributor that can be searched, grouped and filtered by said user; and displaying, on a graphical user interface of said user including a first panel and a second panel, said social stream comprising the first subset and the second subset in said first panel in sequence upon said search; said hierarchical relationship between said first subset and said subset in said second panel; and a social search path that is indicative of a search or navigation path taken by said user in arriving at said social stream comprising said first subset and said second subset, thereby presenting said results to said user hierarchically across multiple dimensions to reflect their relationship to said search term.

17. The method of claim 16, wherein said search is multi-dimensional.

18. The method of claim 17, wherein said search is conducted along two or more social dimensions selected from the group consisting of social entity, social contributor and social tag.

19. The computer-implemented method of claim 16, wherein the second subset is different from the first subset.

20. The computer-implemented method of claim 16, wherein said relationships are stored in memory as indexes to permit a search of said social media content based upon said relationships by said user.

21. The computer-implemented method of claim 16, wherein said hierarchical relationship and said subsets of results are simultaneously displayed in said first panel and said second panel, respectively.

22. A computer-implemented method for searching for multidimensional social media content, comprising:

receiving, from a user, a request for a search of social media content, wherein said search is directed to a search term selected by said user, wherein said search term comprises one or more of a social contributor, social entity and social tag;

conducting, with the aid of a computer processor operatively coupled to a database of social media content, a search of social media content in said database, wherein said search of social media content is directed to said search term, wherein said social media content in said database is collected from one or more social providers, and wherein said social media content is organized in said database based upon relationships between social entities, social contributors and social tags identified in said social media content, which relationships are based upon social tags present in social media content of social entities and social contributors;

calculating a social engagement score and a social post score, calculating from said calculated social engagement score and social post score a social score of each individual social media content of a social stream including results of said search, and prioritizing said each individual social media content by said social score, wherein said social engagement score is based on a social relevance of said social contributors and social entities and is determined by the number of friends, fans, followers, or other measurement that assesses a social network presence of said social contributors and social entities, wherein said social post score is based on a degree of interaction of a social contributor or a social entity among said social contributors and social entities with social posts at said one or more remote social media providers, wherein said degree of interaction is determined as a net of positive and any negative interactions by said social contributor or social entity with respect to said social posts on said one or more remote social media providers;

grouping, with the aid of a computer processor, at least a portion of said results of said search by social contributor, social entity and social tag to provide a first subset and a second subset of results, wherein the second subset is hierarchically related to the first subset, and wherein said at least the portion of said results is sorted by said social score;

and displaying, on a graphical user interface of said user: a social stream comprising the first subset and the second subset to said user in a first panel of said graphical user interface in sequence; a hierarchical relationship between said first subset and said second subset in a second panel of said graphical user interface, wherein said second subset is different from the first subset; and a social search path this is indicative of a search or navigation path taken by said user in arriving at said social stream comprising said first subset and said second subset of the multidimensional social media content.

23. A computer-implemented method for searching for multidimensional social media content over a network, comprising:

conducting, with the aid of a computer processor, a search for multidimensional social media content at a plurality of remote social media providers over said network, wherein said search is directed to a search string provided by a user;

identifying, with the aid of said computer processor, social entities, social contributors and tags in multidimensional social media content revealed upon the search, wherein said social entities, social contributors and tags are associated with said multidimensional social media content revealed upon the search, wherein said social contributors have posted said multidimensional social media content on said plurality of remote social media providers, wherein said social entities are subjects to which said collected multidimensional social media content relate, and wherein said social entities are different from said social contributors for said multidimensional social media content posted on said plurality of remote social media providers;

establishing, with the aid of a computer processor, relationships between said search string and the identified tags, between said search string and the identified social entities and social contributors, and between said identified tags and said identified social entities and social contributors;

calculating a social score from a social engagement score and a social post score, wherein said social engagement score is based on a social relevance of said social contributors and social entities and is determined by the number of friends, fans, followers, or other measurement that assesses a social network presence of said social contributors and social entities, wherein said social post score is based on a degree of interaction of a social contributor or a social entity among said social contributors and social entities with social posts at one or more remote social media providers, wherein said degree of interaction is determined as a net of positive and any negative interactions by said social contributor or social entity with respect to said social posts on said one or more remote social media providers;

generating a social stream from at least a portion said multidimensional social media content at said plurality of remote social media providers that is sorted by said social score, wherein said social stream includes social media activities of a social entity or social contributor that can be searched, grouped and filtered by a user; and displaying, on a graphical user interface including a first panel and a second panel, said social stream comprising a first subset and a second subset of said multidimensional social media content to said user in said first panel in sequence upon the search of the multidimensional social media content; a hierarchical relationship between said first subset and said subset in said second panel, wherein said second subset is different from the first subset; and a social search path that is indicative of a search or navigation path taken by said user in arriving at said social stream comprising said first subset and said second subset of the multidimensional social media content, thereby presenting said multidimensional social media content to said user hierarchically across multiple dimensions to reflect their relationship to a search criterion.

24. The computer-implemented method of claim 23, wherein said displaying further comprises displaying said multidimensional social media content on said graphical user interface.

25. The computer-implemented method of claim 24, wherein said graphical user interface displays said relationships.

26. The computer-implemented method of claim 23, wherein said search is conducted by a social search engine that indexes social media activities for searching, filtering, and displaying said social media content.

27. The computer-implemented method of claim 23, further comprising displaying the first subset and the second subset of the multidimensional social media content in a hierarchical structure.

28. The computer-implemented method of claim 23, further comprising displaying the second subset of the multidimensional social media upon searching the first subset of the organized social media.

29. The computer-implemented method of claim 23, wherein said relationships are stored in memory as indexes to permit a search of said multidimensional social media content based upon said relationships by said user.

30. The computer-implemented method of claim 23, wherein said hierarchical relationship and said first subset and second subset are simultaneously displayed in said first panel and said second panel, respectively.

* * * * *